United States Patent
Sakuma

(10) Patent No.: US 10,712,994 B2
(45) Date of Patent: Jul. 14, 2020

(54) IMAGE COMPRESSING METHOD, IMAGE RECONSTRUCTING METHOD, IMAGE COMPRESSING DEVICE, IMAGE RECONSTRUCTING DEVICE, IMAGE COMPRESSING PROGRAM PRODUCT, AND IMAGE RECONSTRUCTING PROGRAM PRODUCT

(71) Applicant: NEXPOINT CO., LTD., Tokyo (JP)

(72) Inventor: Akihiro Sakuma, Tokyo (JP)

(73) Assignee: NEXPOINT CO., LTD., Tokyo (JP)

( * ) Notice: Subject to any disclaimer, the term of this patent is extended or adjusted under 35 U.S.C. 154(b) by 20 days.

(21) Appl. No.: 16/310,166

(22) PCT Filed: Jun. 23, 2017

(86) PCT No.: PCT/JP2017/023167
§ 371 (c)(1),
(2) Date: Dec. 14, 2018

(87) PCT Pub. No.: WO2018/003685
PCT Pub. Date: Jan. 4, 2018

(65) Prior Publication Data
US 2019/0179593 A1 Jun. 13, 2019

(30) Foreign Application Priority Data

Jun. 28, 2016 (JP) .................................. 2016-127109

(51) Int. Cl.
*G06F 3/14* (2006.01)
*H04N 1/41* (2006.01)
(Continued)

(52) U.S. Cl.
CPC ............. *G06F 3/1454* (2013.01); *H04N 1/41* (2013.01); *H04N 19/507* (2014.11);
(Continued)

(58) Field of Classification Search
None
See application file for complete search history.

(56) References Cited

U.S. PATENT DOCUMENTS

| 7,197,535 B2 | 3/2007 | Salesky et al. |
| 8,606,029 B1 | 12/2013 | Wong et al. |
| (Continued) | | |

FOREIGN PATENT DOCUMENTS

| CN | 1361630 A | 7/2002 |
| CN | 101443737 A | 5/2009 |
| (Continued) | | |

OTHER PUBLICATIONS

Chinese Office Action issued in Chinese Patent Application No. 201780040183.1 dated Jun. 4, 2019.
(Continued)

*Primary Examiner* — Christopher J Kohlman
(74) *Attorney, Agent, or Firm* — Pearne & Gordon LLP

(57) ABSTRACT

A method includes: a splitting step in which a full-screen image data acquired in a full-screen image acquiring step is split into block images in a predetermined size from one end of a screen area; a positional information creating step in which block images at two sequential time instants are compared in every block image split in the splitting step to create positional information data expressing presence or absence of a difference and positional information about a block considered to have a difference; and a compressed difference image creating step in which a block determined as a block considered to have a difference in the positional information creating step is a difference block, and an image collection created by arranging block images of difference blocks at the identical time instant is compressed as one image to create a compressed difference image.

15 Claims, 9 Drawing Sheets

(51) Int. Cl.
    *H04N 19/507*     (2014.01)
    *H04N 21/2743*    (2011.01)
    *H04N 21/44*      (2011.01)
    *H04N 21/4402*    (2011.01)
(52) U.S. Cl.
    CPC ..... *H04N 21/2743* (2013.01); *H04N 21/4402* (2013.01); *H04N 21/44008* (2013.01)

(56) References Cited

U.S. PATENT DOCUMENTS

| | | |
|---|---|---|
| 2004/0003104 A1 | 1/2004 | Boskovic et al. |
| 2006/0251330 A1 | 11/2006 | Toth et al. |
| 2009/0002275 A1 | 1/2009 | Yamaguchi |
| 2011/0252326 A1 | 10/2011 | Asano |
| 2011/0286529 A1* | 11/2011 | Meggers ............... H04N 19/119 375/240.24 |
| 2012/0183075 A1* | 7/2012 | Karkkainen ......... H04N 19/176 375/240.24 |
| 2014/0115445 A1 | 4/2014 | Yano |

FOREIGN PATENT DOCUMENTS

| | | |
|---|---|---|
| CN | 1857001 B | 12/2011 |
| CN | 105474644 A | 4/2016 |
| EP | 1 635 581 A1 | 3/2006 |
| JP | S50-151020 A | 12/1975 |
| JP | H07-74925 A | 3/1995 |
| JP | 2000-156819 A | 6/2000 |
| JP | 2009-010871 A | 1/2009 |
| JP | 2013-051534 A | 3/2013 |
| JP | 2014-072599 A | 4/2014 |
| JP | 2014-081866 A | 5/2014 |
| RU | 2 370 908 C2 | 10/2009 |
| RU | 2 493 588 C2 | 9/2013 |
| WO | 2009-073827 A1 | 6/2009 |
| WO | 2011-106937 A1 | 9/2011 |
| WO | 2014-202830 A1 | 12/2014 |

OTHER PUBLICATIONS

Russian Office Action issued in Russian Patent Application No. 2019102018 dated Mar. 19, 2019.
Extended European Search Report issued in European Patent Application No. EP 17 82 0042 dated Mar. 18, 2019.
Taiwan Office Action issued in Taiwanese Patent Application No. 106121452 dated Mar. 28, 2019.
International Search Report Issued in Patent Application No. PCT/JP2017/023167 dated Aug. 1, 2017.
Written Opinion Issued in Patent Application No. PCT/JP2017/023167 dated Aug. 1, 2017.

* cited by examiner

IMAGE COMPRESSING METHOD, IMAGE RECONSTRUCTING METHOD, IMAGE COMPRESSING DEVICE, IMAGE RECONSTRUCTING DEVICE, IMAGE COMPRESSING PROGRAM PRODUCT, AND IMAGE RECONSTRUCTING PROGRAM PRODUCT

TECHNICAL FIELD

The present disclosure relates to a screen image transfer method that transfers an image displayed on a computer screen and a screen image reconstructing method that reconstructs a transferred screen image into an original image.

BACKGROUND ART

Conventionally, image processing is known as screen image transfer methods of transferring, to another device (e.g. a recording server), the content on the screen of the display of the personal computer (PC) that is changed over time due to use, for example, in real time. In order to avoid an increase in data volumes due to transfer of image data in the bitmap format, the image processing includes reducing resolution, reducing gray scale level of colors, and roughening pictures by transferring image data that is converted into JPEG format, by transferring only differences, or by transferring differences that are converted into JPEG format (e.g. see JP 2009-10871 A).

SUMMARY OF INVENTION

An image compressing method according to an aspect of the present disclosure includes: a full-screen image acquiring step in which full-screen image data displayed on a screen of a display is sequentially acquired; a compressed full-screen image creating step in which a full-screen image acquired every predetermined recording time period in the full-screen image acquiring step is compressed to create a compressed full-screen image; a splitting step in which the full-screen image data acquired in the full-screen image acquiring step is split into block images from one end of a screen area; a positional information creating step in which block images at two sequential time instants are compared in every block images split in the splitting step to create positional information data expressing presence or absence of a difference and positional information about a block considered to have a difference; and a compressed difference image creating step in which a block determined as a block considered to have a difference in the positional information creating step is a difference block, and an image collection created by arranging block images of difference blocks at an identical time instant is compressed as one image to create a compressed difference image.

DESCRIPTION OF EMBODIMENTS

Figure 1:
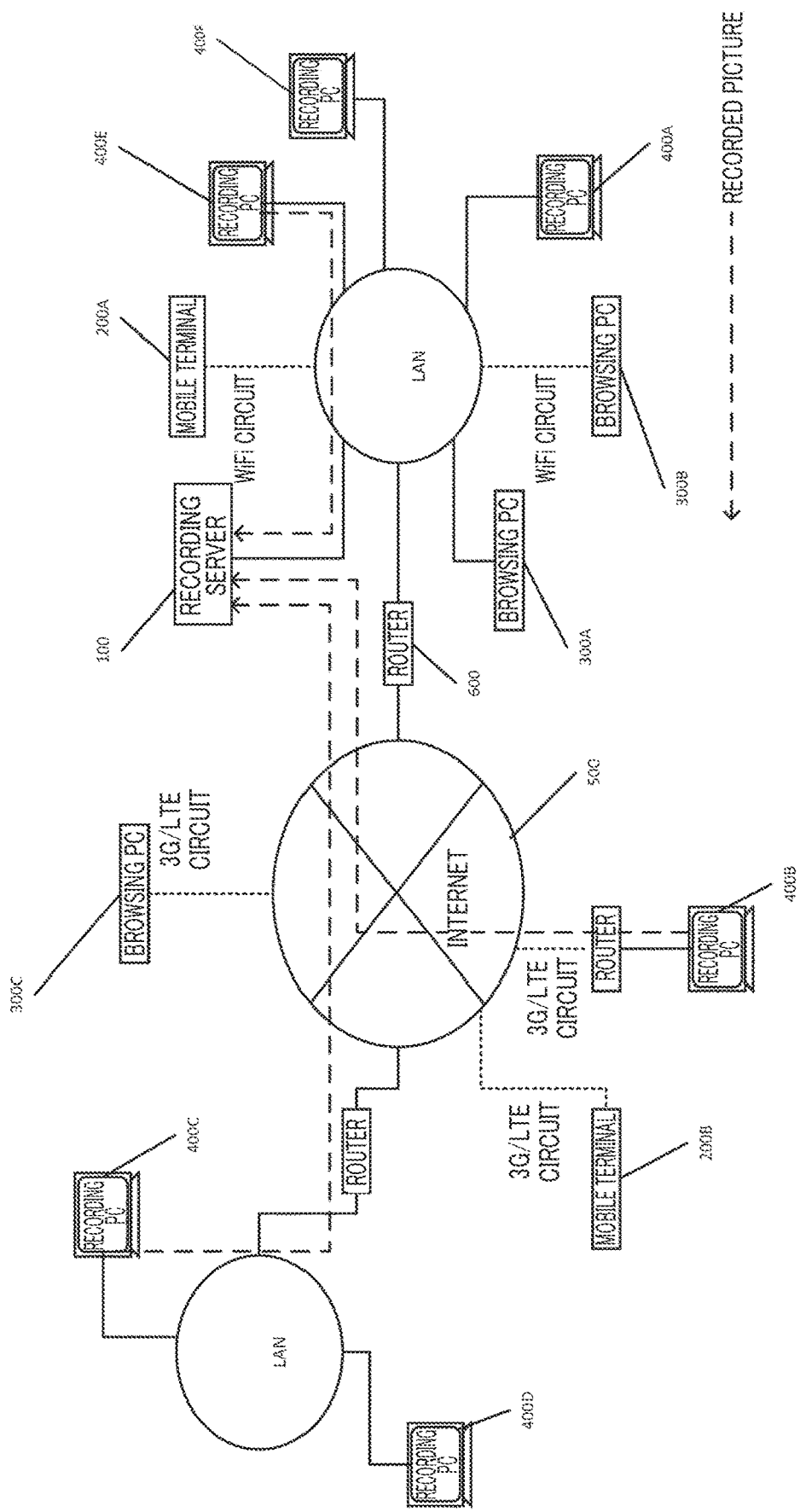
FIG. 1 is a diagram showing an exemplary system configuration of a personal computer (PC) screen monitoring system using a first embodiment of a screen image transfer method according to an exemplary embodiment.

However, the conventional screen image transfer method has a problem that volumes are immeasurably increased in data transfer in the bitmap format. In order to avoid this problem, in transfer in which the format is converted into the JPEG format, there is a problem that volumes are made small by increasing JPEG compression ratios or by reducing resolution, resulting in a decrease in resolution, for example.

In a method that detects only areas where changes are observed (differences) with no change in resolution for data transfer in order to avoid the problem of resolution decrease, volumes are decreased or by decreasing the number of colors or by devising data formats, for example. However, this method has problems that the load of a PC processing data is prone to increase and volumes are not decreased sufficiently.

That is, the conventional screen image transfer methods have problems that compression or decompression causes a reduction in resolution to degrade images, that data volumes to be transferred are large, or that the load of the PC processing data is increased.

Therefore, an object of the exemplary embodiment is to solve the problems above and to provide a screen image transfer method that can prevent the image quality of a screen image on the display of a personal computer from being degraded and can efficiently transfer the screen image, and enables a decrease in the load of the PC processing data.

In order to achieve the object, a first aspect of the exemplary embodiment is to provide a screen image transfer method that causes a personal computer connected to the server via the network to execute: a full-screen image acquiring step in which full-screen image data displayed on a screen of a display is acquired every certain time interval; a compressed full-screen image creating step in which a full-screen image acquired every predetermined recording time period in the full-screen image acquiring step is JPEG-compressed to create and accumulate a compressed full-screen image, a compressed full-screen image is not created until a lapse of a predetermined recording time period every time when a compressed full-screen image is created, and the step goes to a subsequent step; a full-screen image transferring step in which a full screen data file including the compressed full-screen image created in the full-screen image creating step is created and the full screen data file is transferred to the server; a splitting step in which the full-screen image data acquired in the full-screen image acquiring step is split into block images of a matrix of eight by eight picture elements from one end of a screen area; a positional information creating step in which block images at two sequential time instants are compared in every block image split in the splitting step to create positional information data expressing presence or absence of a difference and positional information about a block considered to have a difference based on a block sequential number; a parallel number calculating step in which a block determined as a block considered to have a difference in the positional information creating step is categorized into a difference block to calculate, from the number of difference blocks at an identical time instant, the number of parallel blocks to be horizontally arranged in order to form a rectangle with the smallest margin by arranging all block images of the difference blocks at the identical time instant; a compressed difference image creating step in which a step is repeated in which the block images of the difference blocks in the number of the parallel blocks calculated in the parallel number calculating step are horizontally arranged and then arranged on the under side, an image collection in a rectangle with the margin blanked is created, the collection is JPEG-compressed as one image, and the compressed difference image is created and accumulated; and a difference image transferring step in which a difference data file including the compressed difference image and pieces of positional information data is created and the file is transferred to the server.

According to the first aspect of the exemplary embodiment, one image composed only of difference images is JPEG-compressed and transferred. Thus, the image quality of the screen image on the display of the personal computer can be prevented from being degraded, the screen image can be efficiently transferred, and a decrease in the load of the PC processing data is enabled.

Note that the term "image" includes meanings of both of a still image and a moving image. In the present application, the still image is expressed as "image", and the moving image is expressed as "picture" for distinguishing between the images.

The block image of a matrix of eight by eight picture elements is an image in the minimum unit of the JPEG component, and the image is in the most efficient size in the steps of compression, transfer, and decompression.

In the positional information creating step, in the comparison, a hash value is generated for each block image and compared, a block with an unequal calculated value is categorized into a block with a difference, and a block with an equal calculated value is categorized into a block with no difference. The positional information data is preferably one byte data or two byte data in which a first one bit expresses presence or absence of a difference and seven bits or 15 bits express a number of continuous blocks in which the presence or absence of difference is the same.

The data volumes of positional information to be transferred can be considerably made small. Note that the positional information data may be coordinates data on the display. There is a merit that although data volumes are large, positions are grasped by only seeing data.

Until a lapse of the predetermined recording time period, the steps from the full-screen image acquiring step to the compressed difference image creating step are repeated except the full-screen image transferring step. After that, instead of the compressed difference image transferring step, an accumulated image transferring step is preferably included in which an accumulation data file including the compressed full-screen image, the compressed difference images accumulated until a lapse of a predetermined recording time period, and pieces of positional information data is created and the file is transferred to the server.

Unnecessary header information can be decreased, and the minimum information volume is used.

Alternatively, the steps from the screen image acquiring step to the difference image transferring step may be repeated every certain time interval.

The difference data file is transferred every time, and hence browse in real time is enabled, although the information volume of header information is increased.

A second aspect of the exemplary embodiment is to provide a reconstructing method for an image transferred to a server by the screen image transfer method of the first aspect of the exemplary embodiment described above, the reconstructing method including:

a difference block reconstructing step in which the image collection is reconstructed from the compressed difference image to reconstruct block images of difference blocks; and a full-screen image reconstructing step of repeating a step for the predetermined recording time period in which the block image of the difference block is placed on a full-screen image at a previous time instant based on the positional information data to create a full-screen image at subsequent time instant.

According to the second aspect of the exemplary embodiment, an image of high resolution can be reconstructed, and hence a moving image of high resolution can be replayed.

In the present disclosure, the term "network" includes networks configured of communication networks, such as local area networks (LANs), the Internet, Wireless-Fidelity (Wi-Fi) circuits, third generation (3G) long-term evolution (LTE) circuits, and leased circuits, and combinations of these circuits. A group of the displays (recording PCs) of personal computers on the recorded side does not have to be connected to the recording server via LAN networks, even a recording PC connected to the Internet thought 3G/LTE circuits can considerably reduce the information volume of data that can replay moving images of high resolution after reconstruction and can transfer the data to the recording server, increasing the range of monitorable PCs. Note that the recording server may be a cloud server. More preferably, the moving image compression format of images acquired from the recording PC group is the H.264 format that provides high compression at the present point in time. The device is light-weight, and easily mounted on any of hardware and software.

According to the exemplary embodiment, the image quality of the screen image on the display of the personal computer can be prevented from being degraded, the screen image can be efficiently transferred, and a decrease in the load of the PC processing data is enabled.

In the following, the exemplary embodiment will be described more in detail using embodiments. However, these embodiments do not limit the exemplary embodiment.

First Embodiment

Configuration

The screen of the display of a personal computer (PC) that is an example of image compressing devices changes every moment due to the use of the PC or execution of programs by a user, for example. A screen image transfer method according to a first embodiment of the exemplary embodiment and an image reconstructing method according to the first embodiment are methods usable for a PC screen monitoring system that monitors one or a plurality of such PC screens for monitoring.

In the embodiment, the term "recording PC" is a personal computer that transfers screen images to a recording server that is an example of an image reconstructing device connected via a network and is a target to be monitored.

The screen image transfer method according to the first embodiment of the exemplary embodiment is a screen image transfer method with which the recording PC connected to the recording server via the network transfers screen images combined in a predetermined recording time period to the recording server. The image reconstructing method according to the first embodiment of the exemplary embodiment is a method with which the recording server edits images gathered on the recording server in accordance with the screen image transfer method according to the first embodiment of the exemplary embodiment and reconstructs the images. These methods enable saving, on the recording server, the images reconstructed by the image reconstructing method according to the first embodiment of the exemplary embodiment, and enable transmission of images on the recording PC monitored via the network from the recording server to a monitoring user terminal.

The PC screen monitoring system transmits images reconstructed by the image reconstructing method according to the first embodiment, and the system replays, rewinds, and fast-forwards live images, and replays libraries as well. In the embodiment, images on the screen of the recording PC can be made in a considerably small size for a certain time period as well as difference images. Thus, information volumes to be transferred can be decreased at the minimum, volumes transferred from the recording PC to the recording server can be made small, and gathering of the screen images of the recording PC is enabled with no recording server installed at a local site. Data volumes on communications can be decreased, compared with simple gathering of screen images of the recording PC, a load on the network is small, as well as monitoring with images of high resolution is enabled when images are reconstructed.

In the screen image transfer method according to the first embodiment of the exemplary embodiment, the JPEG properties are exploited in which image are not affected by images in the adjacent blocks in compression and decompression of images in a block unit. Thus, the minimum image degradation is achieved, JPEG is adopted, images are compressed, and hence another compression process is eliminated. That is, from the findings, the processes conventionally performed can be eliminated by solving problems how to reduce data volumes and how to compress reduced data based on the JPEG format. The states are achieved in which blocks with differences are converted into JPEG images as they are with no change in the number of colors or data formats, and hence difference data can be automatically created in the minimum time as well as a highly compressed state is achieved.

FIG. 1 is a diagram showing an exemplary system configuration of a PC screen monitoring system using the first embodiment of the screen image transfer method according to the exemplary embodiment. On a network 500 composed of a combination of communication networks, such as LANs, the Internet, Wi-Fi circuits, 3G/LTE circuits, and leased circuits, the following is connected: (1) a plurality of recording PCs 400A to 400F that are monitor targets;

(2) a recording server 100 that is connected to the recording PCs 400A to 400F through the network 500, acquires and accumulates image data from the recording PC 400, and transmits the data to a terminal; and (3) mobile terminals 200A and 200B, such as smartphones, and browsing PCs 300A to 300C, such as desktop personal computers (PCs) and notebook PCs, are connected as terminals that are connected to the recording server 100 through the network 500, receive image data from the recording server 100 and display the data. In FIG. 1, exemplary flows of image data captured on the recording PC are depicted by dotted arrows. Note that in the following, the mobile terminals and the browsing PCs are collectively referred to as "terminals" or "Viewers".

The recording server 100 is connected to the recording PCs 400B to 400D that are monitor targets through the network 500 including the Internet. In the embodiment, monitor target recording PCs can be provided on networks other than the LAN to which the recording server 100 is connected as the recording PCs 400A, 400E, and 400F. To the Internet network connected to the LAN to which the recording server 100 is connected through a router 600A, 3G/LTE circuits are connected, and another LAN is connected through a router 600C. The recording PC 400B is connected to the Internet network through the router 600B through the 3G/LTE circuit. The recording PCs 400C and 400D are connected the LAN to which the recording server 100 is not connected. FIG. 1 shows a non-limiting exemplary connection in which the recording PCs, the browsing PCs, or the mobile terminals are connected to the recording server through a plurality of networks. In the embodiment, communications between the recording PC 400 and the recording server 100 are performed in accordance with the Transport Control Protocol (TCP) of high reliability in which a session is established and then communications are started.

Not only the recording PC as well as the browsing PC 300 that is an image display terminal are not limited to the case in which the PC 300 is present in the LAN to which the recording server 100 is connected. The PC 300 may be connected to the recording server 100 through a plurality of networks, such as the Internet, LANs, and Wi-Fi circuits. The mobile terminal 200 that is an image display terminal may be connected to the recording server 100 through a plurality of networks, such as LANs, the Internet, and mobile telephone networks (Wi-Fi circuits, 3G/LTE circuits, and any other circuits), for example. Note that the router 600 is present between the LAN and the Internet and between the recording PC and the Internet.

One recording server 100 can sequentially acquire screen images displayed on a display 403 of the recording PC 400 from the plurality of recording PCs 400. In the embodiment, since image data is transferred from the recording PC 400 side to the recording server 100 at a predetermined timing, the recording server fails to grasp the situations when communications are disconnected. However, the load on network traffic is small because information volumes to be transferred are small, and the ports of the routers do not have to be changed.

Note that in the embodiment, upon being activated, the recording PC authenticates the connection to the recording server, and notifies the recording server that the recording PC is in the activated state. After the recording server instructs the recording PC to start recording by the acknowledge to the authentication, the recording PC acquires a screen image, and then the recording PC acquires screen images at a predetermined interval using the timer of the recording PC. In the embodiment, images are acquired every certain time interval, at timing every second or five seconds, for example, using the timer in the recording PC. A JPEG compressed full-screen image is created only at the first compression, and JPEG-compressed difference images are created after the first. The acquisition and compression are repeated until a lapse of a predetermined recording time period, ten minutes, for example, the compressed full-screen image and the compressed difference images in a predetermined recording time period are combined into a file, and the file is transferred to the recording server. These processes are repeated. In the compression of images into JPEG formats, zero degradation of image quality is enabled. An increase in JPEG compression ratios is also enabled in the range visible to the human eye.

In PC screen monitoring systems using conventional screen image transfer methods, volumes are large, compression processes are separately needed, or image quality is degraded. However, in the embodiment, the image quality of the screen image on the display of the personal computer can be prevented from being degraded, the screen image can be efficiently transferred, and a decrease in the load of the PC processing data is enabled. Thus, volumes are sufficiently small, the recording PCs that are monitor targets and portable terminals, for example, can be provided on the Internet as well as on the 3G/LTE circuits, and hence the degree of freedom is considerably enhanced.

Figure 2:
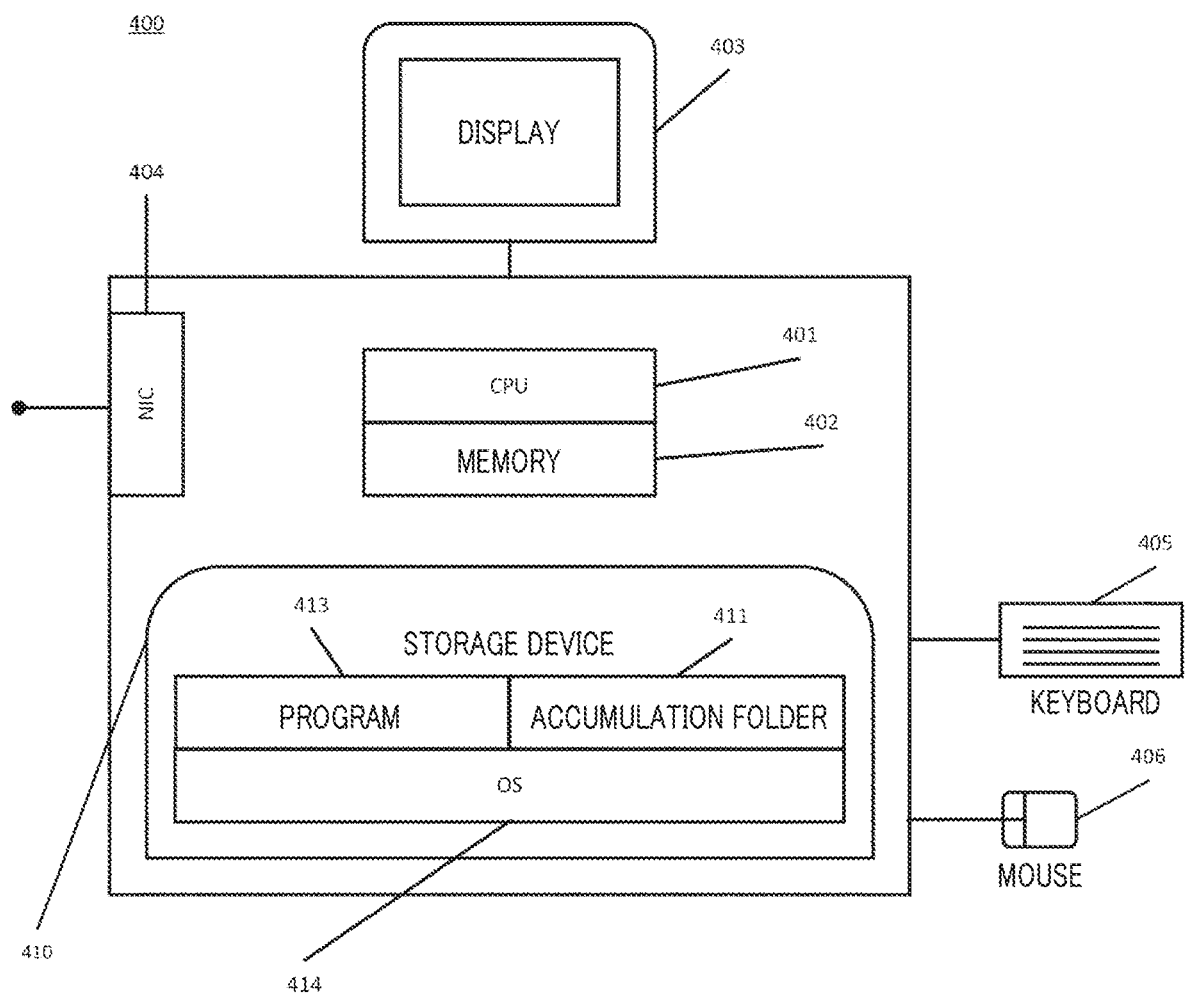
FIG. 2 is a block diagram of a recording PC of the first embodiment of the screen image transfer method according to the exemplary embodiment.

FIG. 2 is a block diagram of the recording PC of the first embodiment of the screen image transfer method according to the exemplary embodiment. The recording PC 400 is equipped with: a control arithmetic logic unit having a central processing unit (CPU) 401 with a memory 402 that is a cache memory, device drivers, and any other device; a storage device 410 having a main storage device, such as a DRAM, and an auxiliary storage device, such as a hard disk; and an input-output device composed of a communication controller, such as a network interface 404, the display 403 that is a display device, a keyboard 405, a mouse 406, and any other device. On the storage device 410, an accumulation folder 411, a configuration folder, a program 413, and an operating system 414 are stored. The program 413 is generally stored on the auxiliary storage device of the storage device 410, and is loaded to main storage device in execution.

The accumulation folder 411 is a folder in which images are saved. The accumulation folder 411 accumulates compressed full-screen images and image collections. The full-screen images are images that the complete image of the full screen is acquired by capturing the screen shot of the display 403 of the recording PC and then the images are JPEG-compressed. The image collections are created by the difference between a previously captured complete image and a subsequently captured complete image. In the configuration folder, an image collection creation condition, a capture interval condition, a recording time period condition, a compression ratio condition, and any other condition are accumulated.

The program 413 includes various programs, such as an image recording and transmission program. Upon receiving an image request from the recording server 100, the recording PC 400 performs a connection authentication process (activation). The server 100 and the PC 400 hold encryption keys and any other tools each other with such authentication for establishing connection. When the encryption keys and any other tools are different, the server 100 and the PC 400 fail to establish connection. Thus, this can prevent information on the recording PC from leaking to a server that is not involved.

In the embodiment, upon being activated, the recording PC 400 starts authentication of the connection to the recording server, and this notifies the recording server that the recording PC is in the activated state. After the recording server 100 instructs the PC 400, first, the recording PC 400 performs the first-time screen image acquisition. After that, the PC 400 acquires a screen image every certain interval using the timer of the recording PC, creates a predetermined file, and transmits the file to the recording server 100.

The recording PC 400 achieves the function of a computer that enables acquiring, editing and saving images and transmitting the images to the recording server in the monitoring method using the screen image transfer method according to the embodiment by the CPU 401 that loads and executes the image recording and transmission program 413 on the memory 402. The CPU 401 is an arithmetic processing unit installed on a typical computer. The CPU 401 executes various programs, and performs various kinds of control, for example.

In the embodiment, the image recording and transmission program 413 is a program that causes a computer to achieve: (1) a connection function that receives a connection request from the recording server connected via the network for connection to the recording PC; (2) a full-screen image acquiring function that acquires full-screen image data displayed on the screen of the display every certain time interval; (3) a compressed full-screen image creating function in which a full-screen image acquired by the full-screen image acquiring function every predetermined recording time period is JPEG-compressed to create and accumulate a compressed full-screen image, a compressed full-screen image is not created until a lapse of a predetermined recording time period every time when a compressed full-screen image is created, and the step goes to a subsequent step; (4) a splitting function that splits the full-screen image data acquired by the full-screen image acquiring function into block images with a predetermined matrix of picture elements from one end of a screen area; (5) a positional information creating function that compares block images at two sequential time instants in every block image split by the splitting function to create positional information data expressing the presence or absence of a difference and positional information about a block considered to have a difference according to how many blocks with a difference are sequentially arrayed and how many blocks with no difference are sequentially arrayed; (6) a parallel number calculating function that categorizes a block considered to have a difference determined by the positional information creating function into a difference block, and calculates, from the number of difference blocks at an identical time instant, the number of parallel blocks to be horizontally arranged in order to form a rectangle with the smallest margin by arranging all block images of the difference blocks at the identical time instant; (7) a compressed difference image creating function that repeats the step in which the block images of the difference blocks in the number of the parallel blocks calculated by the parallel number calculating function are horizontally arranged and then arranged on the under side, creates an image collection in a rectangle with the margin blanked, JPEG-compresses the collection as one image, and creates and accumulates the compressed difference image; (8) a repeating function that repeats the steps from full-screen image acquisition to compressed difference image creation until a lapse of a predetermined recording time period; and (9) an accumulated image transferring function that creates an accumulation data file including the compressed full-screen image, the compressed difference images accumulated until a lapse of a predetermined recording time period, and pieces of positional information data and transfers the file to the server.

The above-described certain interval time can be one second and five seconds, for example. A predetermined recording time period can be ten minutes, for example. Therefore, the compressed full-screen image (I frame) is created in starting a predetermined recording time period, every ten minutes, for example, and the image that is created every certain time period, one second, for example, during the ten minutes, is the compressed difference image (the J frame). In the embodiment, the accumulation data file is created as one file including an image that combines images for a predetermined recording time period, i.e. one compressed full-screen image, a large number of compressed difference images, and positional information data. Note that the accumulation data file is additionally provided with necessary information, such as a header.

In the embodiment, in the splitting function, the block image is a block of a matrix of eight by eight picture elements. The block image is the minimum unit in the JPEG format, and hence this combines the minimum information volume and maintaining resolution.

Note that in the embodiment, as an example, the block image is sized in a matrix of eight by eight picture elements. However, the size is non-limiting. The size may be predetermined sizes (e.g. a 16 by 16 picture element block). In the case in which a full-screen image is split in a predetermined size unit, in creating the compressed full-screen image and the compressed difference image, the images may be JPEG-compressed. However, images are preferably compressed in the block unit that in the predetermined size. Thus, images can be compressed in the block image unit for the difference block in creating the compressed difference image, and hence when the block images of the difference blocks is placed as it is in reconstructing the original full-screen image, the original full-screen image can be correctly reproduced with no further processing.

Note that the method is non-limiting. In creating the compressed full-screen image and the compressed difference image, images may be compressed in another image format, or images may be compressed by another compressing method.

In the embodiment, the positional information creating function creates the hash values of the block images and compared, and determines that the a block with an unequal calculated value is categorized into a block with a difference, and a block with an equal calculated value is categorized into a block with no difference. The positional information data is one byte data or two byte data in which the presence or absence of a difference is expressed by the first one bit and the number of continuous blocks in which the presence or absence of difference is the same is expressed by seven bits or 15 bits. In the case of one byte, the sequential number can be expressed up to 127. In the case two bytes, the sequential number can be expressed up to 32,767.

In regenerating the hash values of the block images for comparison, a 64 bit hash value (1) is generated for the previously acquired image in an eight by eight matrix of picture elements (dots or pixels). Subsequently, a 64 bit hash value (2) is generated for the image acquired this time in an eight by eight matrix of picture elements (dots or pixels). In comparison of the hash value (1) with the hash value (2), when these values are equal, it is determined that no difference (change) is present, whereas in the case in which these values are different in comparison of the hash value (1) with the hash value (2), it is determined that a difference (change) is present.

Figure 3:
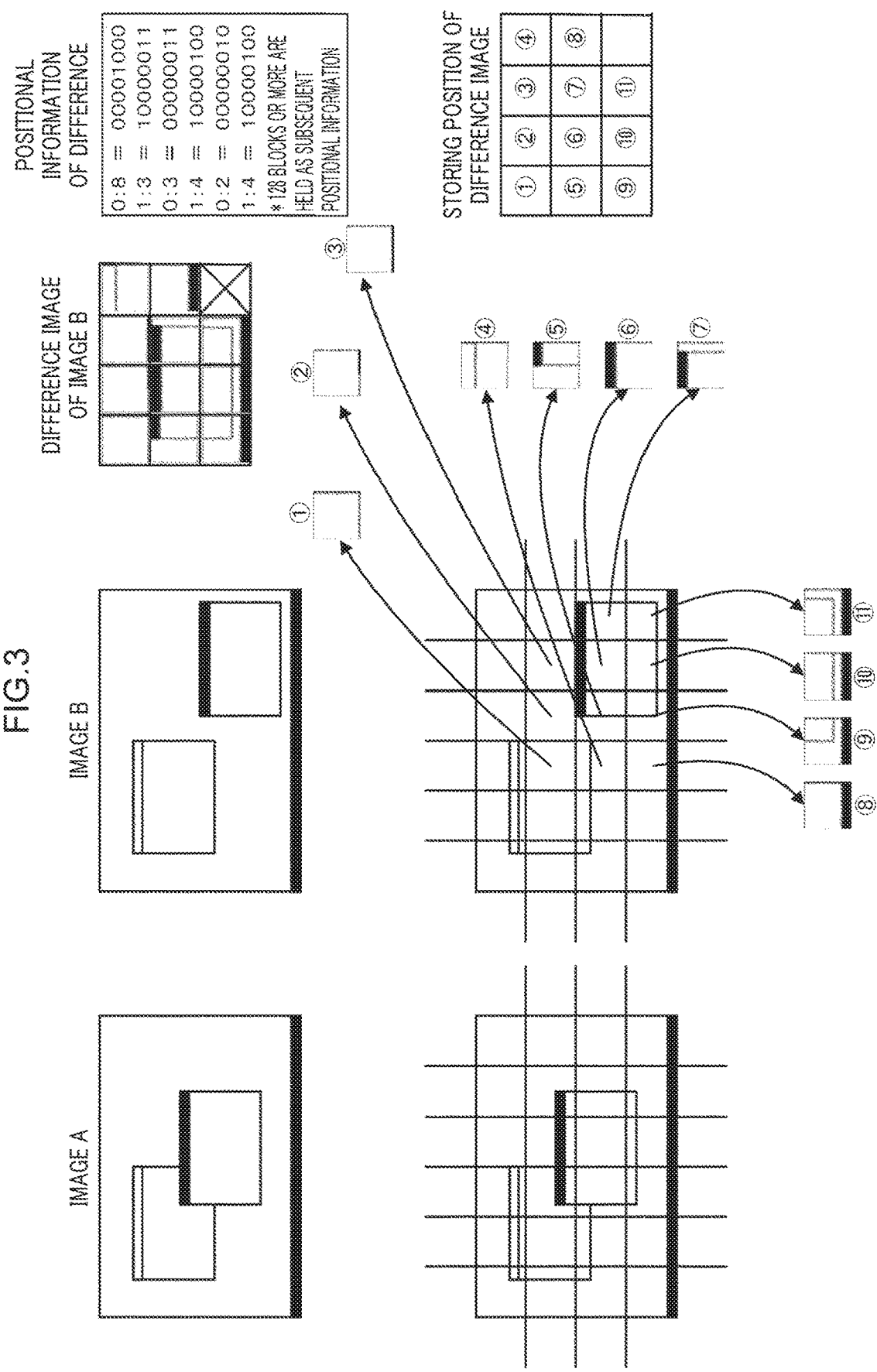
FIG. 3 is a conceptual diagram when a difference image on the recording PC is created in the first embodiment of the screen image transfer method according to the exemplary embodiment.

FIG. 3 is a conceptual diagram of when the difference image on the recording PC is created in the first embodiment of the screen image transfer method according to the exemplary embodiment. An image (image A) previously acquired and an image acquired this time (image B) are split into blocks in a matrix of eight by eight picture elements, and then only blocks with different images in the blocks at the same positions between the image A and the image B (difference blocks) are sequentially arranged. When the blocks are arranged, all the blocks are arranged to form a rectangle with a margin. In order to form the rectangle, the number of parallel blocks to be horizontally arranged is calculated. In the embodiment, a predetermined number of picture elements, eight picture elements, is advanced to the under side to arrange the blocks every time when the block images of the difference blocks in the calculated number of the parallel blocks is horizontally arranged. That is, the blocks are repeatedly arranged on the under side every calculated number of the parallel blocks, an image collection in a rectangle with the margin blanked is created, the collection is JPEG-compressed as one image, and then the compressed difference image is created. The repeat of the processes described above is a repeat of processes in which the block images of the difference blocks in the calculated number of the parallel blocks is horizontally arranged, and after arranged, the block images of the difference blocks in the number of the parallel blocks are horizontally arranged on the under side. For example, in the case in which the number of difference blocks at time t1 is 11, a matrix of the blocks is composed of three by four blocks in order to form a rectangle with the smallest margin. Thus, the first block to the fourth block are sequentially arranged on the first row from the left, the fifth block to the eighth block are arranged on the second row below the first row, and then the ninth block to the eleventh block are sequentially arranged on the third row from the left. The right block on the third row is a with the margin blanked. Therefore, one image collection formed of a matrix of 24 by 32 picture elements with difference blocks and an empty block is JPEG-compressed as one image. The JPEG minimum unit that is a matrix of eight by eight picture elements is used, and hence when the compressed difference image is divided into the individual difference block images, original difference block images can be obtained with no influence from the adjacent blocks.

Even though the original difference blocks are obtained, the original image is not formed unless the positions of the blocks are unknown. Thus, in transferring image collections to the recording server, the image collections are each additionally provided with positional information about each difference block. For example, in one byte, in the case in which no difference (change) is present sequentially in 120 blocks and a difference (change) is sequentially present in 300 blocks, the block considered to have a difference is expressed by one, the block with no difference is expressed by zero, and positional information is expressed by 0:120 and 1:300. In bit expression where the presence or absence of a difference is the first bit, 01111000 (the first positional information: no change (0) in 120 blocks), 11111111 (the second positional information: changed (1) in 127 blocks), 11111111 (the third positional information: changed (1) in 127 blocks), and 10101110 (the fourth positional information: changed (1) in 46 blocks (=300−127−127)). In two bytes, the manageable number of blocks can be increased.

The connection between the recording PC and the recording server is established in accordance with the Transmission Control Protocol/Internet Protocol (TCP/IP). In order to identify the recording PC, authentication is made using a user ID and a password set on the recording server side, and then a request is made to capture camera images, for example. Authentication is preferably made using an authentication database on the recording server.

Even though the recording server does not belong to the LAN to which the recording PC is connected, when the server is connected via a network through the router, the recording PC connects to the IP address and port number of the recording server.

Figure 4:
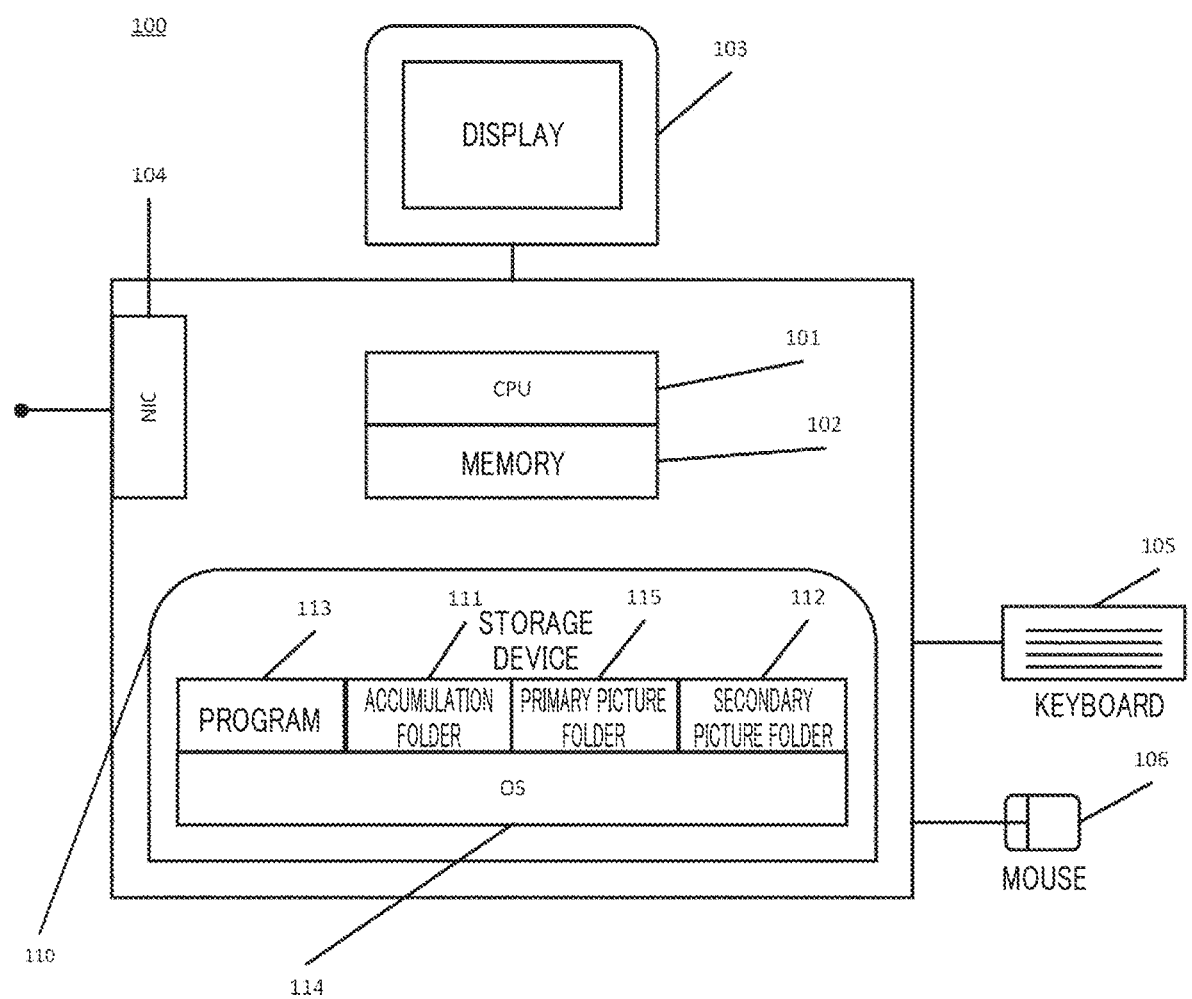
FIG. 4 is a block diagram of a recording server of the first embodiment of the screen image transfer method according to the exemplary embodiment.

FIG. 4 is a block diagram of the recording server of the first embodiment of the screen image transfer method according to the exemplary embodiment. The recording server 100 is equipped with: a control arithmetic logic unit having a central processing unit (CPU) 101 with a memory 102 that is a cache memory, device drivers, and any other device; a storage device 110 having a main storage device, such as a DRAM, and an auxiliary storage device, such as a hard disk; and an input-output device composed of a communication controller, such as a network interface 104, a display 103 that is a display device, a keyboard 105, a mouse 106, and any other device. On the storage device 110, an accumulation folder 111, a primary picture folder 115, a secondary picture folder 112, a program 113, an authentication database, and a configuration folder, for example, as well as an operating system 114 are stored. The program 113 is generally stored on the auxiliary storage device of the storage device 110, and loaded to main storage device in execution.

The accumulation folder 111 is a folder that saves images. In the accumulation folder 111, accumulation data files including the compressed full-screen images and the compressed difference images acquired from the recording PC 400 are accumulated. In the primary picture folder 115, moving images formed only of complete images composed of the full-screen images reconstructed from the compressed full-screen images and the compressed difference images accumulated in the accumulation folder 111, i.e. moving images entirely composed of I frames are accumulated as primary picture data. In the secondary picture folder, primary picture data for a certain time period accumulated in the primary picture folder 115 is moving image-compressed and converted, and accumulated as secondary picture data.

In the method of reconstructing a full-screen image from compressed difference images, for example, in the case in which the image B in FIG. 3 is reconstructed, regarding the number of blocks with no change (120 blocks), block images are formed from the upper left block in the previous image (in FIG. 3, the image A) in the same number (120 blocks) based on the first positional information (01111000) added to the image collection. Subsequently, regarding the number of blocks with changes (300 blocks), block images are sequentially formed in the same number (300 blocks) from the upper left block in the image collection based on the second to the fourth positional information (11111111, 11111111, and 10101110). Subsequently, regarding the number of blocks with no change (the number is supposed to be 100 blocks), block images in the same number (100 blocks) are formed from the 421st block image in the image A based on one piece or a plurality of pieces of positional information at the fifth positional information and later that the first bit is zero. Regarding the number of blocks with changes (the number is supposed to be 50 blocks), block images are formed in the same number (50 blocks) from the 301st block image from the upper left block in the image collection based on one piece or a plurality of sequential pieces of positional information. These processes are repeated to reconstruct the image B. Unlike camera images in natural environments in which light fluctuates and winds blow, for example, on the PC screen, areas with changes on the screen are often small, and hence the volume of the image collection can be considerably a small volume.

Figure 5:
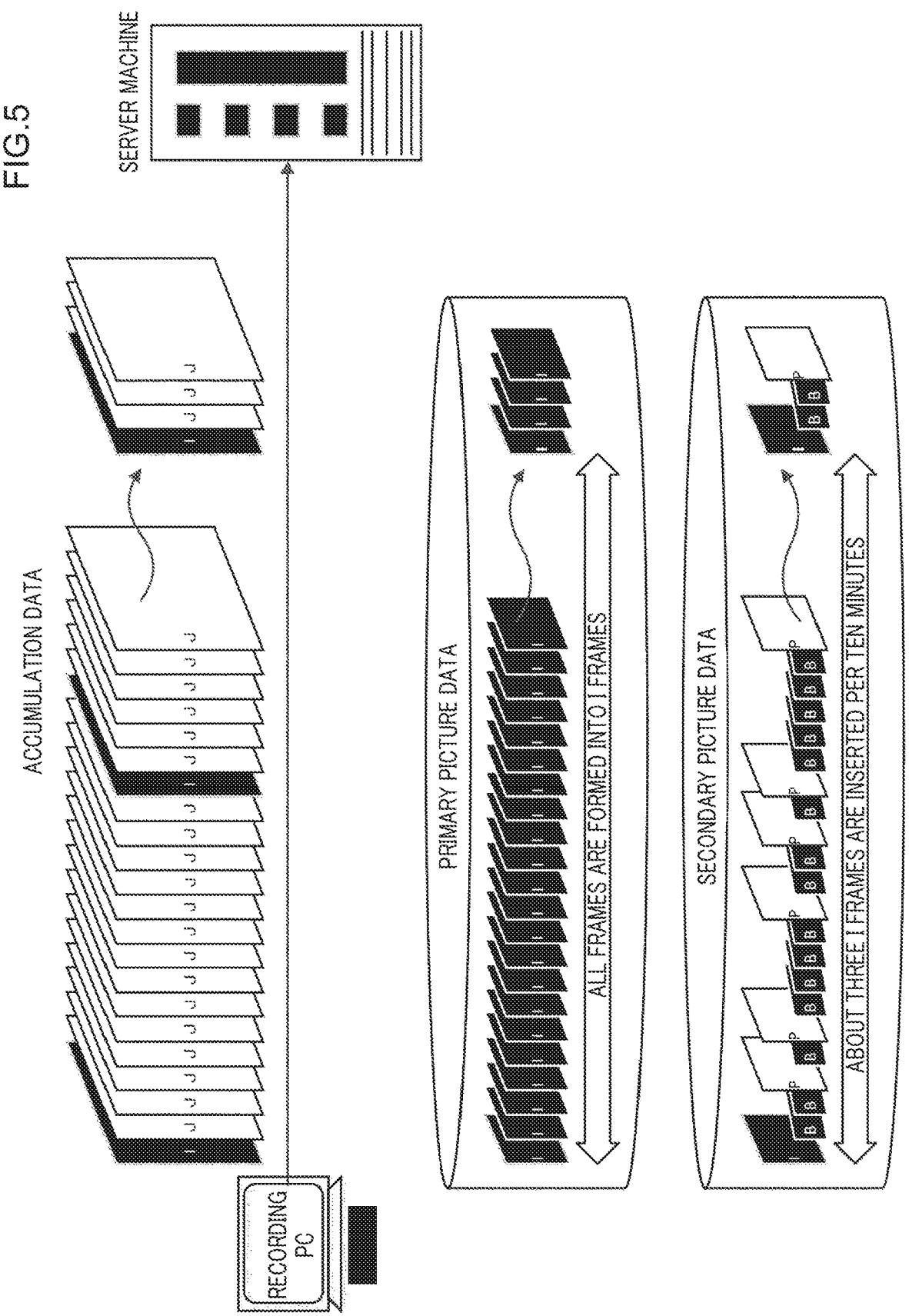
FIG. 5 is an illustration of a transfer method from the recording PC to the recording server and a saving method on the recording server in a flow of the first embodiment of the screen image transfer method according to the exemplary embodiment.

FIG. 5 is an illustration of a transfer method from the recording PC to the recording server and a saving method on the recording server in a flow of the first embodiment of the screen image transfer method according to the exemplary embodiment. In FIG. 5, the compressed full-screen images are expressed as I frames, and compressed difference images are expressed as J frames. In converting and compressing a moving image into secondary picture data, the number of I frames is decreased. The recording time period in which data is combined in one file and transferred the file is ten minutes, for example, the number of I frames is decreased to about three frames per ten minutes, the numbers of P frames and B frames are increased and inserted, and volumes are reduced with no degradation. In this case, the number of J frames to be transferred from the recording PC to the recording server is 599 frames per ten minutes because the J frame is captured at the interval of every second. Since primary picture data is all composed of I frames, the number of I frames reaches 600 frames for a ten minute recording time period. In secondary picture data, frames can be compressed as three I frames, 197 P frames, and 400 B frames, for example, for a ten minute recording time period.

The program 113 includes various programs, such as a gathering and editing program and a transmission program. In the authentication database, IDs and passwords are accumulated, and the connection terminals, such as the screen PCs 400 and 701, the mobile terminal 200, and the browsing PC 300 are accumulated as unique identifications (UIDs). In the embodiment, the recording server 100 possesses the recording server and the terminal that are integrally formed. Since the server 100 also serves as a function of an image display terminal by itself, the server 100 has the display 103, and the keyboard 105 and the mouse 106 that are input units for maintenance and management. In the case in which the replay of images of the recording PC is unnecessary in the recording server, the terminal function as an image display device may not be provided. In the configuration folder, authentication conditions with the recording PCs, the creation intervals of primary picture data or secondary picture data, compression conditions, and any other parameter are accumulated. Although the recording server 100 is an installed server, the server 100 may be a cloud server.

The recording PC 400 is connected to the recording server 100, and transmits images in the case in which images are requested from the acknowledge of the communication. The timer of the recording PC is set at intervals of image transmission (one second, five seconds, and ten minutes, for example).

The recording server 100 achieves the functions of a computer that enables processes from image acquisition from the recording PC to edit and save of the image in the PC screen monitoring method using the screen image transfer method according to the embodiment by loading the gathering and editing program to the memory 102 and executing the program by the CPU 101. The recording server 100 achieves the functions of a computer that achieves the function of a computer that enables a process of transmission of the image to the terminal by loading the transmitting program to the memory 102 and executing the program by the CPU 101. The CPU 101 is an arithmetic processing unit installed on a typical computer. The CPU 101 executes various programs, and performs various kinds of control, for example.

The recording server 100 is one server, or may be a server group composed of a plurality of recording servers. For example, for the secondary picture folder, secondary picture data after a lapse of a certain period (e.g. 24 hours) may be saved on a secondary picture folder provided on another recording server different from the recording server that acquires compressed full-screen images and compressed difference images. The data saved in the past that is not frequently replayed is separated, and hence this enables monitoring of a larger number of recording PCs on the same network.

The gathering and editing program is a program that causes a computer to achieve: (1) the recording PC connection function that connects the recording PC; (2) an image acquiring function that causes the recording server to receive the accumulation data file transferred from the connected recording PC; (3) an accumulating function that accumulates the accumulation data file acquired from the recording PC in the accumulation folder; (4) a difference block reconstructing function that reconstructs an image collection from the compressed difference images included in the accumulated accumulation data file and reconstructs a block image of difference blocks; (5) a full-screen image reconstructing function that places the block images of the difference blocks on the full-screen image at the previous time instant based on the positional information data and creates a full-screen image at the subsequent time instant on all the compressed difference images; and (6) a primary picture data saving function that creates primary picture data as one moving image in the accumulation data file unit from a collection of the reconstructed full-screen images and saves the data in a primary picture data folder.

In the embodiment, the gathering and editing program, as a more preferable aspect, is a program that also causes a computer to achieve a secondary picture data creating function that joins primary picture data every certain time period (e.g. ten minutes) and converts the primary picture data into secondary picture data compressed in a moving image format with a time stamp, i.e. obtained by optimizing the primary picture data. All pieces of the primary image data are complete images (I frames (intra-coded frames)). In the secondary picture data, primary picture data is compressed in the moving image format. For example, the number of I frames is about three frames per ten minutes, a P frame (predictive inter frame) as well as a B frame (bidirectional predictive inter frame) may be inserted in combination, which reduces the volume with no degradation. In the embodiment, since reference can be made to a forward I frame, the B frame can be inserted. Since the B frame is the difference between the current frame and the preceding and following frames, the B frame is smaller than the P frame.

In the embodiment, a transmitting program is a program that causes a computer to achieve: a terminal connecting function that connects the terminal; an image selection accepting function that displays a recording PC list on the terminal and accepts a selection of a recording PC from the terminal; a replay image transmitting function that transmits the image of secondary picture data of the selected recording PC to the terminal; a replay-image-rewind-and-fast-forward accepting function that accepts a replay image rewind request and a replay image fast forward request from the terminal; and a rewound/fast-forwarded image transmitting function that extracts secondary picture data at a point in time by a certain time period (e.g. one second) in the past or in future from the image previously transmitted to the terminal for each rewind request and each fast forward request and transmits the data as a rewound image or a fast-forwarded image to the terminal. Note that similarly to secondary picture data, the image of primary picture data can also be transmitted to the terminal to replay, rewind, and fast-forward the image.

In the embodiment, the connection between the terminals 200 and 300 and the recording server 100 is also performed in accordance with the TCP/IP method in which authentication is made using a user ID and a password, the terminal is confirmed that the terminal is registered on the recording server, and then the images are transmitted. Authentication is preferably authentication by an authentication database on the recording server.

Even though the recording server does not belong to the LAN to which the terminal is connected, when the server is connected via a network through the router, the terminal connects to the IP address and port number of the recording server. For the connection of the terminal, the terminal is authenticated using the UID registered in terminal authentication.

Since the recording server 100 identifies the terminal based on terminal unique information using the UID in stating connection of the mobile terminal 200, the server 100 enables image display in accordance with authentication of the user ID and the password and the matching of terminal unique information.

Figure 6:
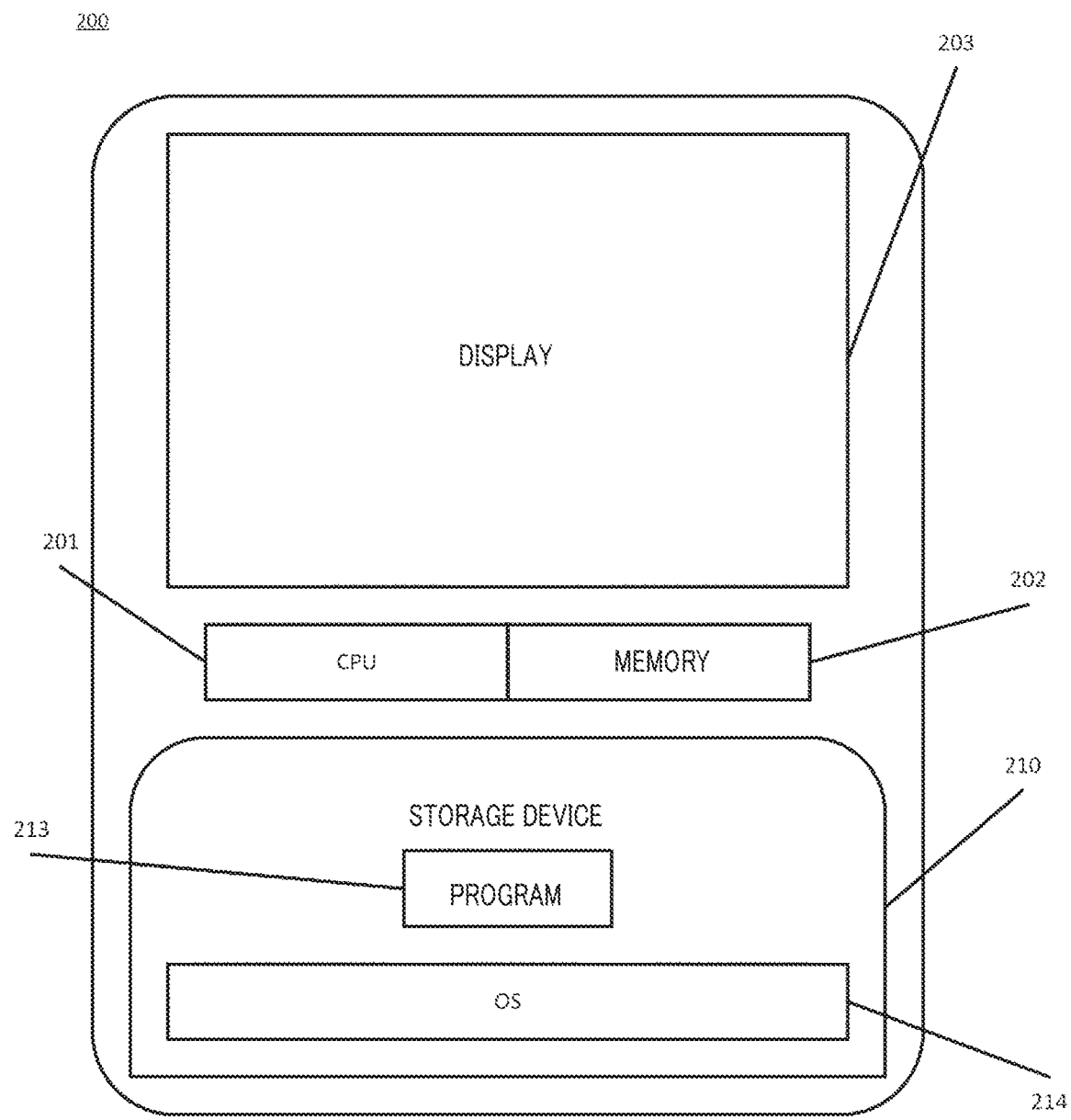
FIG. 6 is a block diagram of a terminal (mobile terminal) of the first embodiment of the screen image transfer method according to the exemplary embodiment.

FIG. 6 is a block diagram of the terminal (mobile terminal) of the first embodiment of the screen image transfer method according to the exemplary embodiment. The mobile terminal 200 is equipped with: a control arithmetic logic unit having a CPU 201 with a memory 202, device drivers, and any other device; the storage device 210; a communication controller that performs data transmission and reception, for example; a display 203 that is a display device; and an input-output device, such as a manipulation button or a touch panel. On the storage device 210, an image display program 213 and an operating system 214 are stored. For example, the mobile terminal 200 is a mobile telephone, such as a smartphone. The terminal 200 achieves the functions of a computer that enables image display in the monitoring method according to the embodiment by loading the image display program 213 to the memory 202 and executing the program 213 by the CPU 201. The CPU 201 is an arithmetic processing unit installed on a typical mobile terminal, and the CPU 201 executes various programs, and performs various kinds of control, for example.

Figure 7:
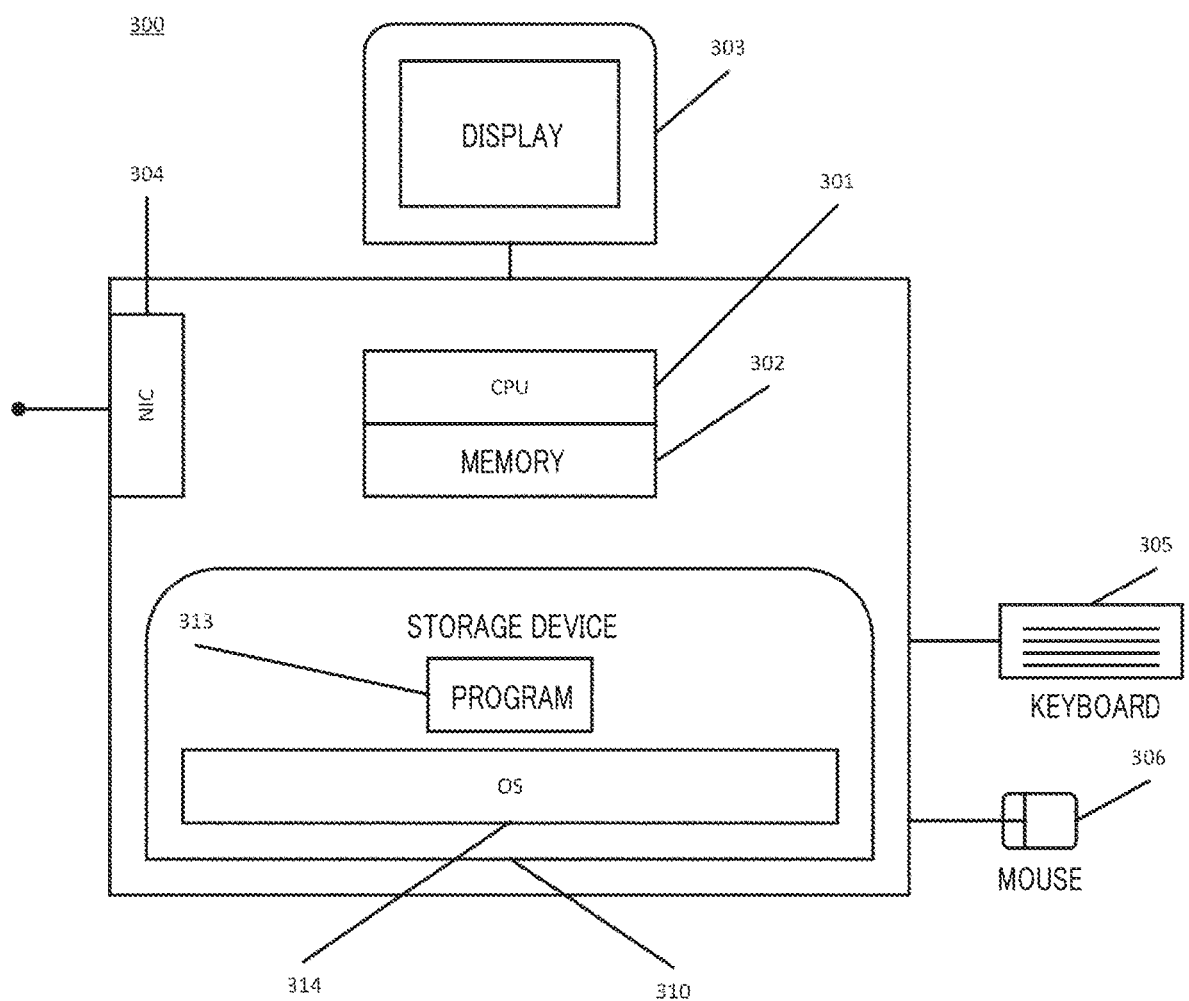
FIG. 7 is a block diagram of a terminal (PC) of the first embodiment of the screen image transfer method according to the exemplary embodiment.

FIG. 7 is a block diagram of the terminal (PC) of the first embodiment of the screen image transfer method according to the exemplary embodiment. The browsing PC 300 is equipped with: a control arithmetic logic unit having a CPU 301 with a memory 302, device drivers, and any other device; a storage device 310 having a main storage device, such as a DRAM, and an auxiliary storage device, such as a hard disk; a communication controller, such as a network interface 304; a display 303 that is a display device; and an input-output device composed of a keyboard 305, a mouse 306, and any other device. On the storage device 310, an image display program 313 and an operating system 314 are stored. The browsing PC 300 is a desktop PC, a notebook PC, a tablet terminal, and any other device, for example. The browsing PC 300 achieves the functions of a computer that enables image display according to the exemplary embodiment by loading the image display program 313 on the memory 302 and executing the program 313 by the CPU 301. The CPU 301 is an arithmetic processing unit installed on a typical PC, and the CPU 301 executes various programs, and performs various kinds of control, for example.

The image display program is a program that causes a computer to achieve a terminal connecting function that establishes connection to the recording server, and an image display function that displays images transmitted from the recording server.

The image display program, as a more preferable aspect, is a program that also causes a computer to achieve:

a rewind start requesting function that accepts an input of a rewind request and requests the recording server for a rewound image during replay image display; a rewind continuation requesting function that requests the recording server for a rewound image every certain time period (e.g. 0.2 second) shorter than an interval to request a replay image during rewound image display; a rewound image fast forward start requesting function that accepts an input of a fast forward request from a user and requests the recording server for a fast-forwarded image during rewound image display; and a rewound image fast forward continuation requesting function that requests the recording server for a fast-forwarded image every certain time period (e.g. 0.2 seconds) shorter than an interval to request a replay image during fast-forwarded image display.

In the embodiment, the recording server 100, the browsing PC 300, and the recording PC 400 are all configured as a personal computer, and are equipped with a clock function and any other function that a typical personal computer has. The mobile terminal 200 is also equipped with a clock function and any other function.

The recording PC 400 according to the first embodiment is a personal computer connected to the recording server 100 via the network, and the PC 400 is provided with: (1) a connecting unit that receives a connection request from the recording server 100 to the recording PC; (2) a full-screen image acquiring unit that acquires full-screen image data displayed on the screen of the display 403 every certain time interval; (3) a compressed full-screen image creating unit in which the full-screen image acquired by the full-screen image acquiring unit every predetermined recording time period is JPEG-compressed to create and accumulate a compressed full-screen image, a compressed full-screen image is not created until a lapse of a predetermined recording time period every time when a compressed full-screen image is created, and the step goes to a subsequent step; (4) a splitting unit that splits the full-screen image data acquired by the full-screen image acquiring unit into block images with a predetermined matrix of picture elements from one end of a screen area; (5) a positional information creating unit that compares block images at two sequential time instants in every block image split by the splitting unit and creates positional information data expressing presence or absence of a difference and positional information about a block considered to have a difference based on a block sequential number; (6) a parallel number calculating unit that categorizes a block considered to have a difference determined by the positional information creating unit into a difference block, and calculates, from the number of difference blocks at an identical time instant, the number of parallel blocks to be horizontally arranged in order to form a rectangle with the smallest margin by arranging all block images of the difference blocks at the identical time instant; (7) a compressed difference image creating unit that repeats a step in which the block images of the difference blocks in the number of the parallel blocks calculated by the parallel number calculating unit are horizontally arranged and then arranged on the under side, creates an image collection in a rectangle with the margin blanked, JPEG-compresses the collection as one image, and creates and accumulates the compressed difference image; (8) a repeating unit that repeats the steps from full-screen image acquisition to compressed difference image creation until a lapse of a predetermined recording time period; and (9) an accumulated image transferring unit that creates an accumulation data file including the compressed full-screen image, the compressed difference images accumulated until a lapse of a predetermined recording time period, and pieces of positional information data and transfers the file to the server.

The recording PC 400 functions as the units (1) to (9) with the hardware configuration and the image recording and transmission program describe above.

The recording server 100 according to the first embodiment is provided with: (1) a recording PC connecting unit that connects the recording PC; (2) an image acquiring unit that causes the recording server 100 to receive an accumulation data file transferred from the connected recording PC; (3) an accumulating unit that accumulates the accumulation data file acquired from the recording PC 400 in the accumulation folder 111; (4) a difference block reconstructing unit that reconstructs an image collection from the compressed difference images included in the accumulated accumulation data file and reconstructs a block image of difference blocks; (5) a full-screen image reconstructing unit that places the block images of the difference blocks on the full-screen image at the previous time instant based on the positional information data and creates a full-screen image at the subsequent time instant on all the compressed difference images; and (6) a primary picture data saving unit that creates primary picture data as one moving image in the accumulation data file unit from a collection of the reconstructed full-screen images the primary picture data folder 115.

The recording server 100 functions as the units (1) to (6) with the hardware configuration and the gathering and editing program described above. The recording server 100 functions as a transmitting unit that transmits replay images, rewound replay images, fast forward replay images to the terminal with the hardware configuration and the transmitting program described above.

The terminals 200 and 300 are provided with:
(1) a recording server connecting unit that connects the recording server 100; (2) an image display unit that displays images transmitted from the recording server 100; (3) a rewind start requesting unit that accepts an input of a rewind request and requests the recording server for a rewound image during replay image display; (4) a rewind continuation request unit that requests the recording server for a rewound image every certain time period (e.g. 0.2 seconds) shorter than an interval to request a replay image during rewound image display; (5) a rewound image fast forward start requesting unit that accepts an input of a fast forward request from a user and requests the recording server for a fast-forwarded image during rewound image display; and (6) a rewound image fast forward continuation request unit that requests the recording server for a fast-forwarded image every certain time period (e.g. 0.2 seconds) shorter than an interval to request a replay image during fast-forwarded image display. The terminal functions as the units (1) to (6) with the hardware configuration and the image display programs 213 and 313 described above.

Note that since primary picture data created using only complete images (I frames) is converted into secondary picture data at the recording server every certain time period, the terminal enables the replay, rewind replay, and fast forward replay of images in a short time, such as a lapse of ten minutes after images are recorded, and also enables the replay, rewind, and fast forward of past screen images of the recording PC after a lapse of a day or longer. Although data volumes are small in the transmission of data from the recording PC to the recording server, replay images, rewound images, and fast-forwarded images are all I frames, and hence the images are of high image quality when replayed as moving images. When past images are replayed, fast forwarded, or rewound in a secondary data creating unit or more, which is not frequently used, secondary picture data that is a compressed and converted moving image file is used, and hence the data volume necessary for saving is small although the data is a moving image.

The PC screen monitoring system composed of the recording PC, the recording server, and the terminal described above is a system that achieves the screen image transfer method according to the first embodiment and the image reconstructing method according to the first embodiment. The system detects differences of the PC screens in JPEG units, generates another image with these differences, and transfers images, and hence volumes to be transferred can be reduced. A monitoring system can be achieved in which loads on the recording PC that compresses images are also small, data volumes to be transmitted from the recording PC to the recording server are small, a problem, such as data delay, is not prone to occur even though the recording PC is provided in environments other than local environments, data volumes to be transmitted from the recording server to the terminal is also small, and loads on the network are small while the system is of high resolution and high image quality. That is, the image quality of the screen image on the display of the personal computer can be prevented from being degraded, the screen image can be efficiently transferred, and a decrease in the load of the PC processing data is enabled. Data volumes simultaneously flowing on the network are small, and hence PC screen images can be flowed to the recording server via general Internet circuits, for example, and PC screen information can also be flowed to general Internet circuits, for example. Data accumulation is enabled using a cloud server over the Internet circuit (wide area network (WAN)).

{Procedures}

The procedures of the first embodiment of the screen image transfer method according to the exemplary embodiment will be described more in detail with reference to the drawing. In the procedures, the PC screen monitoring system composed of the recording PC, the recording server, and the terminal described above is used.

Figure 8:
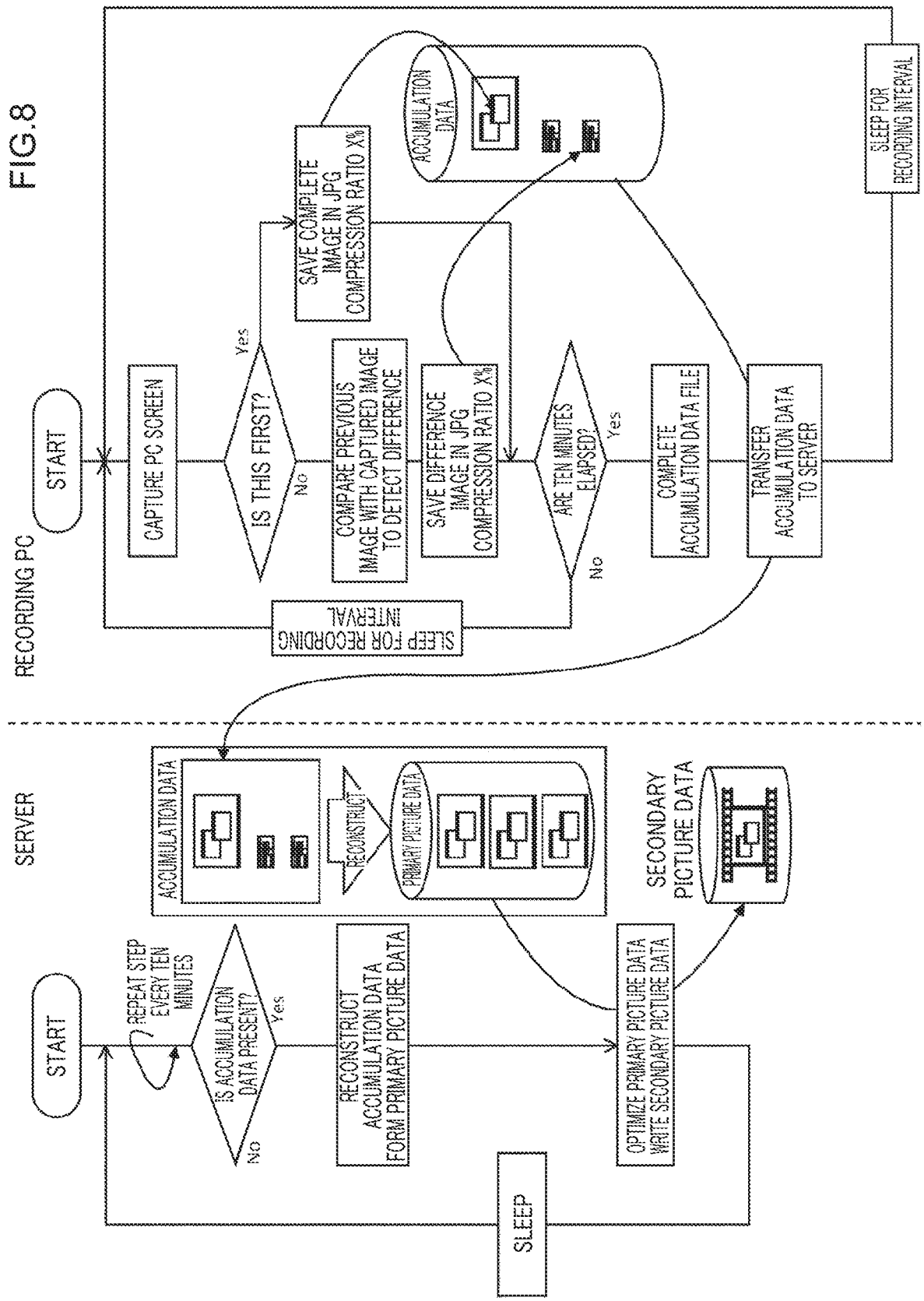
FIG. 8 is a flowchart showing the outline of procedures from capturing the screen of the recording PC to accumulation on the recording server in the first embodiment of the screen image transfer method according to the exemplary embodiment.

FIG. 8 is a flowchart showing the outline of procedures from capturing the screen of the recording PC to accumulation on the recording server in the first embodiment of the screen image transfer method according to the exemplary embodiment.

The recording PC requests the recording server for connection in accordance with the TCP/IP method. The recording PC is composed of one or a plurality of recording PCs. The recording PC makes authentication with the recording server using the user ID and the password. Upon receiving a connection acknowledge from the recording PC, the recording server successfully achieves authentication with reference to the authentication database, the recording server is in connection with the recording PC.

In the screen image transfer method according to the embodiment, after the recording PC is in the activated state, the recording PC authenticates the connection to the recording server described above. After the recording server requests the recording PC to start recording, the recording PC acquires full-screen image data displayed on the screen of the display, JPEG-compresses the acquired full-screen image, creates a compressed full-screen image, and accumulates the image. The compressed full-screen image is created every predetermined recording time period, ten minutes, for example.

After creation of the compressed full-screen image, full-screen image data displayed on the screen of the display is acquired, and then the compressed difference image is created every certain interval time (e.g. one second or five seconds). These processes are repeated until a lapse of a predetermined recording time period (e.g. ten minutes). For example, in the case in which the recording time period is ten minutes (600 seconds) and the interval time is one second, the first one is a compressed full-screen image and the number of compressed difference images is 599 images at the maximum. In the case in which no difference is present, no image collection is available for that time instant, and hence no compressed difference image is present.

An accumulation data file including one compressed full-screen image, compressed difference images (in the case, 599 images at the maximum), and positional information data of each compressed difference image described above is created, and transferred to the recording server.

After a lapse of a predetermined recording time period, the recording PC acquires full-screen image data displayed on the screen of the display, creates and accumulates a compressed full-screen image, acquires full-screen image data displayed on the screen of the display every certain time interval, creates and accumulates the compressed difference images, and then creates an accumulation data file, and transfers the file to the recording server. These processes are repeated.

For creating a compressed difference image, the acquired full-screen image data is split into block images with a predetermined matrix of picture elements from one end of a screen area, block images at two sequential time instants are compared in every split block image, positional information data expressing the presence or absence of a difference and positional information about a block considered to have a difference based on the sequential numbers of blocks is created, the block considered to have a difference is categorized into a difference block, the number of parallel blocks to be horizontally arranged in order to form a rectangle with the smallest margin by arranging all block images of the difference blocks at the identical time instant is calculated from the number of difference blocks at an identical time instant, the step is repeated in which the block images of the difference blocks in the calculated number of the parallel blocks are horizontally arranged and then arranged on the under side, an image collection in a rectangle with the margin blanked is created, the collection is JPEG-compresses as one image, and then a compressed difference image is created.

That is, the embodiment includes: (1) a full-screen image acquiring step in which a personal computer connected to a server via a network acquires full-screen image data displayed on the screen of a display every certain time interval; (2) a compressed full-screen image creating step in which full-screen images acquired in the full-screen image acquiring step are JPEG-compressed every predetermined recording time period to create and accumulate a compressed full-screen image, a compressed full-screen image is not created until a lapse of a predetermined recording time period every time when a compressed full-screen image is created, and the step goes to a subsequent step; (3) a splitting step in which the full-screen image data acquired in the full-screen image acquiring step is split into block images with a predetermined matrix of picture elements from one end of a screen area; (4) a positional information creating step in which block images at two sequential time instants are compared in every block image split in the splitting step to create positional information data expressing presence or absence of a difference and positional information about a block considered to have a difference based on a block sequential number; (5) a parallel number calculating step in which a block determined as a block considered to have a difference in the positional information creating step is categorized into a difference block to calculate, from the number of difference blocks at an identical time instant, the number of parallel blocks to be horizontally arranged in order to form a rectangle with the smallest margin by arranging all block images of the difference blocks at the identical time instant; (6) a compressed difference image creating step in which a step is repeated in which the block images of the difference blocks in the number of the parallel blocks calculated in the parallel number calculating step are horizontally arranged and then arranged on the under side, an image collection in a rectangle with the margin blanked is created, the collection is JPEG-compressed as one image, and the compressed difference image is created and accumulated; (7) repeating the steps (1) from (6) until a lapse of a predetermined recording time period; and (8) an accumulated image transferring step in which after that, the accumulation data file including the compressed full-screen image, the compressed difference images accumulated until a lapse of a predetermined recording time period, and pieces of positional information data is created and the file is transferred to the server. The steps (1) from (8) are sequentially performed until the power supply of the recording PC is turned off or until connection to the recording server is disconnected.

In the embodiment, in the splitting step, the block image is in a matrix of eight by eight picture elements. In the positional information creating step, in the comparison of block images at two sequential time instants with each other, a hash value is generated for the block images and compared, the block with an unequal calculated value is categorized into a block with a difference, and the block with an equal calculated value is categorized into a block with no difference. The positional information data is one byte data or two byte data in which the first one bit expresses the presence or absence of a difference and seven bits or 15 bits express the number of continuous blocks in which the presence or absence of difference is the same.

In JPEG, an image is split into fixed-sized blocks of a matrix of eight by eight picture elements. The image is converted in the block units using discrete cosine transform (DCT). The information volume is decreased by quantization, and then the image is compressed. When a typical image in the format other than JPEG is quantized as it is, image quality is greatly degraded. However, in JPEG compression, quantization is enabled as the properties of the original image remain. That is, in JPEG, even any large-sized image is split into fixed-sized blocks, the image is compressed in every block, and hence the blocks are not affected even though totally different images are adjacent to each other in the block units. In the embodiment, JPEG compression is used with the JPEG properties. In the embodiment, the processes from the extraction of differences, compression, reconstruction, and expansion are based on the JPEG block size, and hence difference information is managed in the minimum volume, achieving the minimum load of the PC processing data.

The positional information may be coordinates management in addition to bit sequences. The image collection is JPEG-compressed as it is, and a JPEG image is generated, i.e. an image is compressed at high speed with the minimum CPU load.

The program of the PC screen monitoring system having the image recording and transmission program causes a computer to execute these steps.

Upon acquiring images from the recording PC, the recording server reconstructs the images. First, the recording server determines the presence or absence of an accumulation data file. In the case in which no accumulation data file is present, the recording server goes into sleep mode until a lapse of the recording time period, and repeats such determination. In the case in which an accumulation data file is present, the recording server performs a difference block reconstructing step in which the recording server reconstructs an image collection from compressed difference images and reconstructs the block images of the difference blocks, and then performs a full-screen image reconstructing step in which the recording server repeats placing the block images of the difference blocks on the full-screen image at the previous time instant based on the positional information data and creating a full-screen image at the subsequent time instant for a predetermined recording time period.

Since the reconstructed images are all full-screen images (I frames), the images are accumulated in the primary picture folder as primary picture data of a moving image formed only of I frames in the recording time period unit. After that, the primary picture data is moving image-compressed and secondary picture data is sometimes created, and then the secondary picture data is accumulated in the secondary picture folder. Specifically, secondary picture data is a compressed moving image in the H.264 format including P frames and B frames with the number of I frames decreased.

The embodiment is the screen image transfer method that can be used for the recording PC monitoring system for management, for example, with which captured PC screen images are transferred to the server, data transferred to the recording server that accumulates data is reconstructed into images that can be displayed on the terminal by the image reconstructing method described above. The difference blocks of the compressed difference images that have been JPEG-compressed are all placed on the complete image at the previous time instant based on the bit sequences or the coordinates information. After all the difference blocks are placed, the complete image at the subsequent time instant is obtained.

(Effect)

According to the embodiment, the image quality of the screen image on the display of the personal computer can be prevented from being degraded, the screen image can be efficiently transferred, and a decrease in the load of the PC processing data is enabled.

The minimum image degradation is achieved, JPEG is adopted, images are compressed, and another compression process is eliminated. Differences are converted into JPEG images as they are with no change in the number of colors or data formats, and hence difference data can be automatically created in the minimum time and a highly compressed state can be achieved.

Second Embodiment

Figure 9:
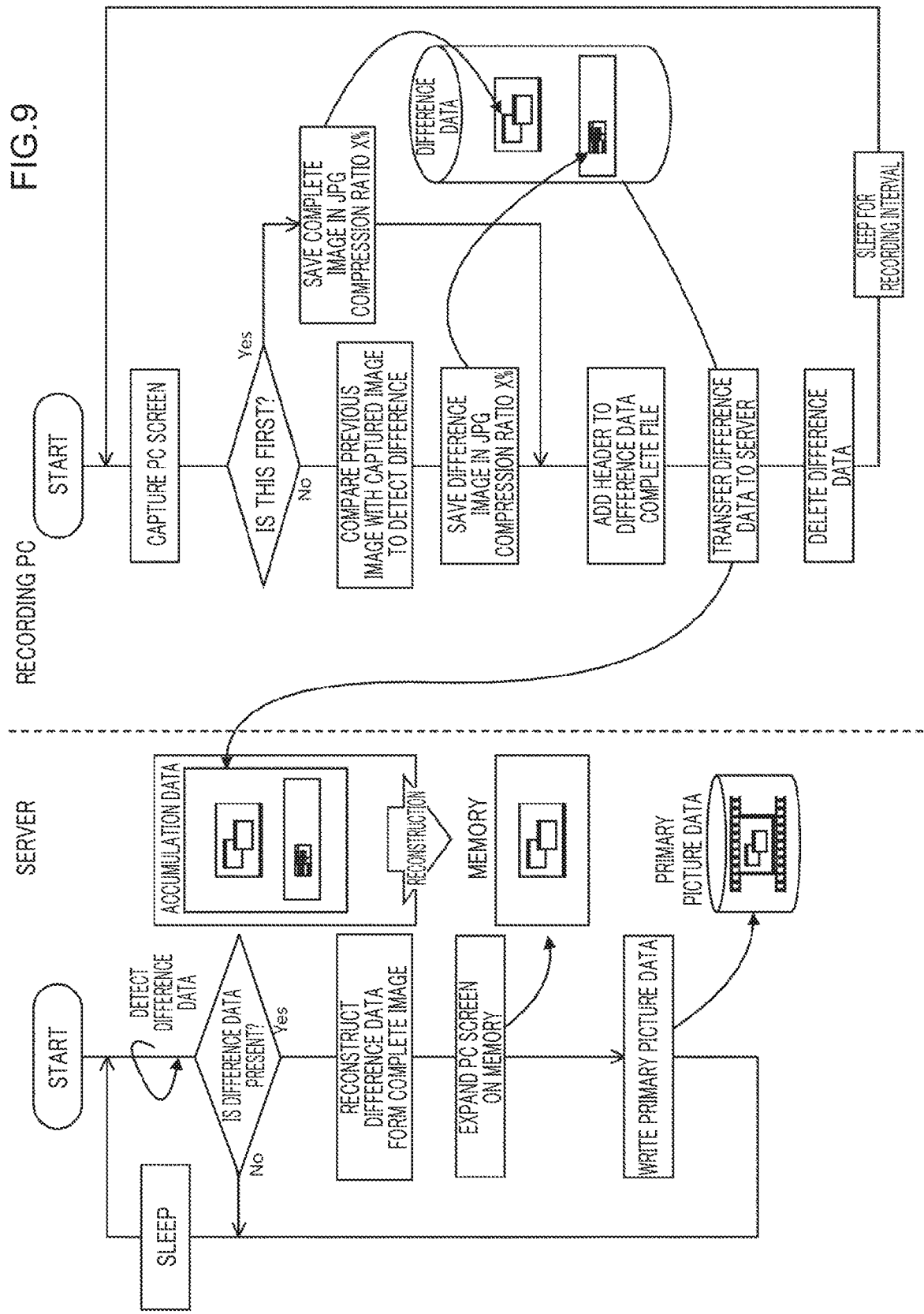
FIG. 9 is a flowchart showing the outline of procedures from capturing the screen of a recording PC to accumulation on a recording server of a second embodiment of the screen image transfer method according to the exemplary embodiment.

FIG. 9 is a flowchart showing the outline of procedures from capturing the screen of a recording PC to accumulation on a recording server of a second embodiment of the screen image transfer method according to the exemplary embodiment. In the screen image transfer method and the image reconstructing method according to the second embodiment, points other than below are similar to those of the first embodiment described above.

In the embodiment, images combined in a predetermined recording time period are not transferred from the recording PC to the recording server. A step is repeated. In the step, images are acquired at timing every certain time interval, one second or five seconds, for example, using a timer in the recording PC. After the recording server sends an image request, a compressed full-screen image is created only at the first time, and then compressed difference images are created. After a full screen data file including the compressed full-screen image or a difference data file including the compressed difference image and positional information data is created, these files are transferred to the recording server, and the transferred image is deleted, and then these steps are repeated. Note that the full screen data file and the difference data file are additionally provided with necessary information, such as a header. The compressed full-screen image is created in starting a predetermined recording time period, and the compressed difference image is created every certain time interval during creation of the compressed full-screen image. This is the same as in the first embodiment.

The embodiment includes: (1) a full-screen image acquiring step in which a personal computer connected to a server via a network acquires full-screen image data displayed on the screen of a display every certain time interval; (2) a compressed full-screen image creating step in which full-screen images acquired in the full-screen image acquiring step are JPEG-compressed every predetermined recording time period to create and accumulate a compressed full-screen image, a compressed full-screen image is not created until a lapse of a predetermined recording time period every time when a compressed full-screen image is created, and the step goes to a subsequent step; (3) a full-screen image transferring step in which a full screen data file including the compressed full-screen image created in the full-screen image creating step is created and the file is transferred to the server; (4) a splitting step in which the full-screen image data acquired in the full-screen image acquiring step is split into block images with a predetermined matrix of picture elements from one end of a screen area; (5) a positional information creating step in which block images at two sequential time instants are compared in every block image split in the splitting step to create positional information data expressing presence or absence of a difference and positional information about a block considered to have a difference based on a block sequential number; (6) a parallel number calculating step in which a block determined as a block considered to have a difference in the positional information creating step is categorized into a difference block to calculate, from the number of difference blocks at an identical time instant, the number of parallel blocks to be horizontally arranged in order to form a rectangle with the smallest margin by arranging all block images of the difference blocks at the identical time instant; (7) a compressed difference image creating step in which a step is repeated in which the block images of the difference blocks in the number of the parallel blocks calculated in the parallel number calculating step are horizontally arranged and then arranged on the under side, an image collection in a rectangle with the margin blanked is created, the collection is JPEG-compressed as one image, and the compressed difference image is created and accumulated; and (8) a difference image transferring step in which a difference data file including the compressed difference image and pieces of positional information data is created and the file is transferred to the server. The steps (1) from (8) are sequentially performed until the power supply of the recording PC is turned off or until connection to the recording server is disconnected.

In the embodiment, an image recording and transmission program 413 on the recording PC is almost the same as the image recording and transmission program of the screen image transfer method according to the first embodiment. However, the program 413 is different from the program according to the first embodiment. The program 413 is a program that causes a computer to also achieve: a full-screen image transferring function that creates a full screen data file including the compressed full-screen image created by the full-screen image creating function and transfers the file to the server; and a difference image transferring function that creates a difference data file including the compressed difference image and pieces of positional information data and transfers the file to the server, instead of the accumulated image transferring function.

A recording PC 400 according to the embodiment is almost the same as the recording PC in the screen image transfer method according to the first embodiment. However, the recording PC 400 is different from the recording PC according to the first embodiment. The recording PC 400 is also provided with: a full-screen image transferring unit that creates a full screen data file including the compressed full-screen image created by the full-screen image creating unit and transfers the file to the server; and a difference image transferring unit that creates a difference data file including the compressed difference image and pieces of positional information data and transfers the file to the server, instead of the accumulated image transferring unit.

In the embodiment, the difference image of a still image on the screen of the recording PC is compressed by a predetermined method and transferred. Thus, information volumes can be decreased at the minimum, volumes to be transferred from the recording PC to the recording server can be made small, and gathering of the screen images of the recording PC is enabled with no recording server installed at a local site. Data volumes on communications can be decreased, compared with simple gathering of screen images of the recording PC, a load on the network is small, as well as monitoring with images of high resolution is enabled when images are reconstructed. Note that a composite image transferring method may be formed in which the first embodiment described above that accumulates images and then transfers images is combined with the second embodiment described above that transfers differences in real time.

In the embodiment, a gathering and editing program of a recording server 100 is a program that causes a computer to achieve: (1) a recording PC connection function that connects the recording PC; (2) an image acquiring function that causes the recording server to receive the full screen data file transferred from the connected recording PC and the difference data file; (3) an accumulating function that accumulates the full screen data file and the difference data file acquired from the recording PC on the accumulation folder; (4) a difference block reconstructing function that reconstructs an image collection from each of compressed difference images included in the accumulated difference data file and reconstructs block images of the difference blocks; (5) a full-screen image reconstructing function that places the block images of the difference blocks on a full-screen image at the previous time instant based on positional information data and creates a full-screen image at the subsequent time instant for all the compressed difference images; and (6) a primary picture data saving function that expands the reconstructed full-screen image on a memory, creates primary picture data as one moving image in the predetermined recording unit from a collection of the reconstructed full-screen images, and saves the data in a primary picture data folder. In the embodiment, similarly to the first embodiment described above, the gathering and editing program is a program that also causes a computer to achieve a secondary picture data saving function that optimizes primary picture data, creates secondary picture data, and saves the data in a secondary picture data folder.

In an accumulation folder 111, a full screen data file including the compressed full-screen image acquired from the recording PC 400 and a difference data file including compressed difference images are accumulated. In a primary picture folder 115, moving images formed only of complete images composed of the full-screen images reconstructed from the compressed full-screen images and the compressed difference images accumulated in the accumulation folder 111, i.e. moving images entirely composed of I frames are accumulated as primary picture data. The primary picture data is all single images (complete images), and hence processes are formed in replay in a considerably simple manner. According to the embodiment, data can be transmitted as moving images to the monitoring-side terminal in real time, and convenience is high. In the secondary picture folder, primary picture data for a certain time period accumulated in the primary picture folder 115 is moving image-compressed and converted, and accumulated as secondary picture data. In converting and compressing a moving image into secondary picture data, the number of I frames is decreased, for example the number of I frames is decreased to about three frames per ten minutes, the numbers of P frames and B frames are increased and inserted, and volumes are reduced with no degradation.

The PC screen monitoring system described above transmits images reconstructed by the image reconstructing method according to the first embodiment to the terminal, for example, and the system replays, rewinds, and fast-forwards live images, and replays libraries as well. The PC screen monitoring system compresses and saves the reconstructed images, transmits the images to the terminal, for example, and the system replays, rewinds, and fast-forwards past images as well. The term "library replay" here means replay after a live image is rewound to the past or means the fast forward replay of images in the past.

In the embodiment, a transmitting program is a program that causes a computer to achieve: a terminal connection function that connects the terminal; an image selection accepting function that displays a recording PC list on the terminal and accepts a selection of a recording PC from the terminal; a live image transmitting function that transmits the image of primary picture data of the selected recording PC as a live image to the terminal; a live image rewind accepting function that accepts a request to rewind the live image from the terminal; a rewound live image transmitting function that extracts primary picture data at a point in time by a certain time period (e.g. one second) in the past from the image previously transmitted to the terminal for each rewind request and transmits the extracted data as a rewound live image to the terminal; a rewound live image fast forward accepting function that accepts a request for the fast forwarded rewound live image from the terminal; and a fast forwarded live image transmitting function that extracts primary picture data at a point in time by a certain time period (e.g. one second) in the future from the image previously transmitted to the terminal for each fast forward request until the image at the present point in time is reached and transmits the data as a fast forwarded live image to the terminal. The term "image at the present point in time" means the newest image acquired from the recording PC. Therefore, the image at the present point in time is changed to a new image every time when images from the recording PC are inputted to the recording server.

The transmitting program is a program that also causes a computer to achieve: a library image accepting function that accepts a request for a library image from a rewound live image from the terminal; and a library image transmitting function that extracts primary image data at a point in future time from the image previously transmitted to the terminal by a certain time period, i.e. by an interval for acquiring latest split data from the recording PC 400 to the recording server 100 for each library image request and transmits the data as a fast forwarded live image to the terminal. Note that the term "library image" stated here means a replayed image after a live image is rewound to the past. Replay, rewind, and fast forward using secondary picture data are similar to those of the first embodiment described above.

According to the embodiment, the image quality of the screen image on the display of the personal computer can be prevented from being degraded, the screen image can be efficiently transferred, and a decrease in the load of the PC processing data is enabled. Although information volumes are increased more than in the first embodiment, the second embodiment is also suited to monitoring in real time.

Note that the exemplary embodiment is not limited to the embodiments, and various modifications are enabled in the scope not deviating from the gist of the exemplary embodiment. The components of the embodiments can be freely combined in the scope not deviating from the gist of the exemplary embodiment.

The recording PCs in the embodiments may execute various processes described above by a method with which the programs to execute processes by the recording PCs in the embodiments are recorded on a computer readable recording medium to form an image compressing program product, the recording PC is caused to read the programs recorded on the recording medium, and the processor executes the programs.

The recording servers in the embodiments may execute various processes described above by a method with which the programs to execute processes by the recording servers in the embodiments are recorded on a computer readable recording medium to form an image reconstructing program product, the recording server is caused to read the programs recorded on the recording medium, and the processor executes the programs.

What is claimed is:
1. A screen image transfer method comprising:
   a full-screen image acquiring step in which a terminal device connected to an image reconstructing device via a network acquires full-screen image data displayed on a screen of a display every certain time interval;

a compressed full-screen image creating step in which a full-screen image acquired every predetermined recording time period in the full-screen image acquiring step is compressed by a method of compressing the full-screen image in every block in a set size to create and accumulate a compressed full-screen image, a compressed full-screen image is not created until a lapse of a predetermined recording time period every time when a compressed full-screen image is created, and the step goes to a subsequent step;

a full-screen image transferring step in which a full screen data file including the compressed full-screen image created in the full-screen image creating step is created and the full screen data file is transferred to an image reconstructing device;

a splitting step in which the full-screen image data acquired in the full-screen image acquiring step is split into block images in the set size;

a positional information creating step in which block images at two time instants are compared in every block image split in the splitting step to create positional information data expressing presence or absence of a difference and positional information about a difference;

a parallel number calculating step in which a block determined as a block considered to have a difference in the positional information creating step is categorized into a difference block to calculate, from a number of difference blocks at an identical time instant, a number of parallel blocks to be horizontally arranged in order to form a rectangle with the smallest margin by arranging all block images of difference blocks at an identical time instant;

a compressed difference image creating step in which a step is repeated in which the block images of the difference blocks in the number of parallel blocks calculated in the parallel number calculating step are horizontally arranged, and an image collection created in a rectangle with the margin blanked is compressed by a method with which the image collection is compressed as one image in every block in the set size to create and accumulate a compressed difference image; and a difference image transferring step in which a difference data file including the compressed difference image and pieces of positional information data is created and the difference data file is transferred to an image reconstructing device.

2. The screen image transfer method according to claim 1, wherein
in the positional information creating step, in the comparison, a hash value is generated for each block image and compared, a block with an unequal calculated value is categorized into a block with a difference, and a block with an equal calculated value is categorized into a block with no difference; and
the positional information data is one byte data or two byte data in which a first one bit expresses presence or absence of a difference and seven bits or 15 bits express a number of continuous blocks in which the presence or absence of difference is the same.

3. The screen image transfer method according to claim 1, wherein:
the steps from the full-screen image acquiring step to the compressed difference image creating step are repeated until a lapse of the predetermined recording time period except the full-screen image transferring step; and after the steps, instead of the compressed difference image transferring step, the method includes an accumulated image transferring step in which an accumulation data file including the compressed full-screen image, the compressed difference images accumulated until a lapse of a predetermined recording time period, and pieces of positional information data is created and the accumulation data file is transferred to an image reconstructing device.

4. A reconstructing method for an image transferred to an image reconstructing device according to the screen image transfer method according to claim 1, the reconstructing method comprising:
a difference block reconstructing step in which the image collection is reconstructed from the compressed difference image to reconstruct block images of difference blocks; and
a full-screen image reconstructing step of repeating a step for the predetermined recording time period in which the block image of the difference block is placed on a full-screen image at a previous time instant based on the positional information data to create a full-screen image at subsequent time instant.

5. A screen image transfer system comprising:
a full-screen image acquiring unit configured to acquire full-screen image data displayed on a screen of a display every certain time interval by a terminal device connected to an image reconstructing device via a network;

a compressed full-screen image creating unit configured to compress the full-screen image acquired at the full-screen image acquiring unit every predetermined recording time period by a method with which the full-screen image is compressed in every block in a set size to create and accumulate a compressed full-screen image, in which a compressed full-screen image is not created until a lapse of a predetermined recording time period every time when a compressed full-screen image is created, and the step goes to a subsequent step;

a full-screen image transferring unit configured to create a full screen data file including the compressed full-screen image created at the full-screen image creating unit and transfer the accumulation data file to an image reconstructing device;

a splitting unit configured to split the full-screen image data acquired at the full-screen image acquiring unit into block images in the set size;

a positional information creating unit configured to compare block images at two time instants in every block image split at the splitting unit to create positional information data expressing presence or absence of a difference and positional information about a difference;

a parallel number calculating unit configured to categorize a block determined as a block with a difference at the positional information creating unit into a difference block, and calculate, from a number of difference blocks at an identical time instant, a number of parallel blocks to be horizontally arranged in order to form a rectangle with the smallest margin by arranging all block images of difference blocks at an identical time instant;

a compressed difference image creating unit configured to repeat a step in which the block images of the difference blocks in the number of parallel blocks calculated at the parallel number calculating unit are horizontally arranged, compress an image collection created in a rectangle with the margin blanked by a method with which the image collection is compressed as one image in every block in the set size and create and accumulate a compressed difference image; and difference image transferring unit configured to create a difference data file including the compressed difference image and pieces of positional information data and transfer the difference data file to an image reconstructing device.

6. An image reconstructing system that reconstructs an image transferred by the screen image transfer system according to claim 5, the image reconstructing system comprising:
   a difference block reconstructing unit configured to reconstruct the image collection from the compressed difference image and reconstruct a block image of a difference block; and
   a full-screen image reconstructing unit configured to repeat a step for the predetermined recording time period in which the block image of the difference block is placed on a full-screen image at previous time instant based on the positional information data and a full-screen image at subsequent time instant is created.

7. A recording medium recording a screen image transferring program that causes a computer to execute:
   a full-screen image acquiring step in which a terminal device connected to an image reconstructing device via a network acquires full-screen image data displayed on a screen of a display every certain time interval;
   a compressed full-screen image creating step in which a full-screen image acquired every predetermined recording time period in the full-screen image acquiring step is compressed by a method of compressing the full-screen image in every block in a set size to create and accumulate a compressed full-screen image, a compressed full-screen image is not created until a lapse of a predetermined recording time period every time when a compressed full-screen image is created, and the step goes to a subsequent step;
   a full-screen image transferring step in which a full screen data file including the compressed full-screen image created in the full-screen image creating step is created and the full screen data file is transferred to an image reconstructing device;
   a splitting step in which the full-screen image data acquired in the full-screen image acquiring step is split into block images in the set size;
   a positional information creating step in which block images at two time instants are compared in every block image split in the splitting step to create positional information data expressing presence or absence of a difference and positional information about a difference;
   a parallel number calculating step in which a block determined as a block with a difference in the positional information creating step is categorized into a difference block to calculate, from a number of difference blocks at an identical time instant, a number of parallel blocks to be horizontally arranged in order to form a rectangle with the smallest margin by arranging all block images of difference blocks at an identical time instant;
   a compressed difference image creating step in which a step is repeated in which the block images of the difference blocks in the number of parallel blocks calculated in the parallel number calculating step are horizontally arranged, and an image collection created in a rectangle with the margin blanked is compressed by a method with which the image collection is compressed as one image in every block in the set size to create and accumulate a compressed difference image; and
   a difference image transferring step in which a difference data file including the compressed difference image and pieces of positional information data is created and the difference data file is transferred to an image reconstructing device.

8. A recording medium recording a reconstructing program for an image transferred to an image reconstructing device by execution of the screen image transferring program according to claim 7, the reconstructing program that causes a computer to execute:
   a difference block reconstructing step in which the image collection is reconstructed from the compressed difference image to reconstruct a block image of a difference block; and
   a full-screen image reconstructing step of repeating a step for the predetermined recording time period in which the block image of the difference block is placed on a full-screen image at previous time instant based on the positional information data to create a full-screen image at subsequent time instant.

9. An image compressing method comprising:
   a parallel number calculating step in which block images at two time instants are compared in every block image in which full-screen image data displayed on a screen of a display is split, a block with a difference is categorized into a difference block, and a number of parallel blocks to be horizontally arranged is calculated, from a number of difference blocks at an identical time instant, in order to form a rectangle with the smallest margin by arranging all block images of difference blocks at an identical time instant; and
   a compressed difference image creating step in which a step is repeated in which the block images of the difference blocks in the number of parallel blocks calculated in the parallel number calculating step are horizontally arranged, and an image collection created in a rectangle with the margin blanked is compressed as one image to create a compressed difference image.

10. An image compressing system comprising:
    a parallel number calculating unit configured to compare block images at two time instants in every block image in which full-screen image data displayed on a screen of a display is split, categorize a block with a difference into a difference block, and calculate a number of parallel blocks to be horizontally arranged, from a number of difference blocks at an identical time instant, in order to form a rectangle with the smallest margin by arranging all block images of difference blocks at an identical time instant; and
    a compressed difference image creating unit configured to repeat a step in which the block images of the difference blocks in the number of parallel blocks calculated in the parallel number calculating step are horizontally arranged, and compress an image collection created in a rectangle with the margin blanked as one image to create a compressed difference image.

11. A recording medium recording an image compressing program that causes a computer to execute:
    a parallel number calculating step in which block images at two time instants are compared in every block image in which full-screen image data displayed on a screen of a display is split, a block with a difference is categorized into a difference block, and a number of parallel blocks to be horizontally arranged is calculated, from a number of difference blocks at an identical time instant, in order to form a rectangle with the smallest margin by arranging all block images of difference blocks at an identical time instant; and a compressed difference image creating step in which a step is repeated in which the block images of the difference blocks in the number of parallel blocks calculated in the parallel number calculating step are horizontally arranged, and an image collection created in a rectangle with the margin blanked is compressed as one image to create a compressed difference image.

12. A screen image transfer method comprising:

a full-screen image acquiring step in which a personal computer connected to a server via a network acquires full-screen image data displayed on screen of a display every certain time interval;

a compressed full-screen image creating step in which a full-screen image acquired every predetermined recording time period in the full-screen image acquiring step is JPEG-compressed to create and accumulate a compressed full-screen image, a compressed full-screen image is not created until a lapse of a predetermined recording time period every time when a compressed full-screen image is created, and the step goes to a subsequent step;

a full-screen image transferring step in which a full screen data file including the compressed full-screen image created in the full-screen image creating step is created and the file is transferred to the server;

a splitting step in which the full-screen image data acquired in the full-screen image acquiring step is split into block images of a matrix of eight by eight picture elements from one end of a screen area;

a positional information creating step in which block images at two sequential time instants are compared in every block image split in the splitting step to create positional information data expressing presence or absence of a difference and positional information about a difference based on sequential numbers of blocks;

a parallel number calculating step in which a block determined as a block with a difference in the positional information creating step is categorized into a difference block to calculate, from a number of difference blocks at an identical time instant, a number of parallel blocks to be horizontally arranged in order to form a rectangle with the smallest margin by arranging all block images of difference blocks at an identical time instant;

a compressed difference image creating step in which a step is repeated in which the block images of the difference blocks in the number of parallel blocks calculated in the parallel number calculating step are horizontally arranged and then arranged on under side, an image collection in a rectangle with the margin blanked is created, the collection is JPEG-compressed as one image, and compressed difference image is created and accumulated; and a difference image transferring step in which a difference data file including the compressed difference image and pieces of positional information data is created and the file is transferred to a server.

13. The screen image transfer method according to claim 12, wherein in the positional information creating step, in the comparison, a hash value is generated for each block image and compared, a block with an unequal calculated value is categorized into a block with a difference, and a block with an equal calculated value is categorized into a block with no difference; and the positional information data is one byte data or two byte data in which a first one bit expresses presence or absence of a difference and seven bits or 15 bits express a number of continuous blocks in which the presence or absence of difference is the same.

14. The screen image transfer method according to claim 12, wherein the steps from the full-screen image acquiring step to the compressed difference image creating step are repeated until a lapse of the predetermined recording time period except the full-screen image transferring step; and after the steps, instead of the compressed difference image transferring step, the method includes an accumulated image transferring step in which an accumulation data file including the compressed full-screen image, the compressed difference images accumulated until a lapse of a predetermined recording time period, and pieces of positional information data is created and the file is transferred to a server.

15. A reconstructing method for an image transferred to a server by the screen image transferring method according to claim 12, the reconstructing method comprising:

a difference block reconstructing step in which the image collection is reconstructed from the compressed difference image to reconstruct block images of difference blocks; and a full-screen image reconstructing step of repeating a step for the predetermined recording time period in which the block image of the difference block is placed on a full-screen image at a previous time instant based on the positional information data to create a full-screen image at subsequent time instant.

* * * * *